(12) United States Patent
Matan et al.

(10) Patent No.: US 12,483,035 B2
(45) Date of Patent: Nov. 25, 2025

(54) ENERGY TRANSACTIONS WITH DISTRIBUTED ENERGY RESOURCES AND DISTRIBUTED GRID MANAGEMENT

(71) Applicant: Apparent Labs, LLC, Novato, CA (US)

(72) Inventors: Stefan Matan, Novato, CA (US); Fred C. Horton, Santa Rosa, CA (US)

(73) Assignee: Apparent Labs, LLC, Novato, CA (US)

( * ) Notice: Subject to any disclaimer, the term of this patent is extended or adjusted under 35 U.S.C. 154(b) by 469 days.

(21) Appl. No.: 17/908,881

(22) PCT Filed: Feb. 18, 2021

(86) PCT No.: PCT/US2021/018625
§ 371 (c)(1),
(2) Date: Sep. 1, 2022

(87) PCT Pub. No.: WO2021/168149
PCT Pub. Date: Aug. 26, 2021

(65) Prior Publication Data
US 2023/0361572 A1    Nov. 9, 2023

Related U.S. Application Data

(60) Provisional application No. 62/978,246, filed on Feb. 18, 2020.

(51) Int. Cl.
*H02J 3/38* (2006.01)
*H02J 13/00* (2006.01)

(52) U.S. Cl.
CPC ........ *H02J 3/381* (2013.01); *H02J 13/00002* (2020.01); *H02J 2300/24* (2020.01); *H02J 2300/28* (2020.01)

(58) Field of Classification Search
CPC ........................................... H02J 3/381
See application file for complete search history.

(56) References Cited

U.S. PATENT DOCUMENTS

2006/0047369 A1* 3/2006 Brewster ............... G06Q 10/06
700/286
2011/0295635 A1* 12/2011 Basak ............... G06Q 10/0631
705/7.12

(Continued)

FOREIGN PATENT DOCUMENTS

CN     104239059 A       5/2018
CN     108028535 A   *   5/2018   ........ G05B 13/024

(Continued)

OTHER PUBLICATIONS

International Search Report and Written Opinion for PCT Patent Application No. PCT/US21/18625, Mailed May 31, 2021, 10 pages.

(Continued)

*Primary Examiner* — Suresh Suryawanshi
(74) *Attorney, Agent, or Firm* — Compass IP Law PC

(57) ABSTRACT

An energy grid network includes multiple distributed energy resources (DERs) or DER nodes. A DER node includes a local energy source and a local energy load. The DER nodes in the network generate realtime data about energy availability from local energy sources and realtime data about energy demand. The DER nodes can share the realtime data with other DER nodes in the network to provide a constant view in the network about the energy generation and energy demand within the network. The shared realtime data can be scaled at each DER node based on physical distance, time to exchange energy between nodes, or both distance and time. A DER node generates its own realtime data and receives data from one or more other DER nodes and determines the value of energy use from local or non-local sources by local and non-local loads.

20 Claims, 13 Drawing Sheets

(56) References Cited

U.S. PATENT DOCUMENTS

| | | | |
|---|---|---|---|
| 2016/0079752 A1* | 3/2016 | Matan | H02J 3/01 307/24 |
| 2016/0079757 A1* | 3/2016 | Matan | G01R 11/54 307/24 |
| 2016/0204606 A1* | 7/2016 | Matan | H02J 13/00034 700/291 |
| 2018/0254637 A1 | 9/2018 | Abate et al. | |
| 2018/0366978 A1 | 12/2018 | Matan et al. | |
| 2019/0036340 A1 | 1/2019 | Meeker et al. | |
| 2019/0267804 A1* | 8/2019 | Matan | H02J 3/01 |
| 2019/0356164 A1 | 11/2019 | Ghaemi et al. | |

FOREIGN PATENT DOCUMENTS

| | | | | |
|---|---|---|---|---|
| JP | 2016527864 A | | 9/2016 | |
| JP | 2019079236 A | * | 5/2019 | |
| KR | 102009841 B1 | | 8/2019 | |
| WO | 2016004433 A1 | | 1/2016 | |
| WO | WO-2017214210 A1 | * | 12/2017 | G05B 19/042 |
| WO | WO-2019084262 A1 | * | 5/2019 | G06F 1/26 |

OTHER PUBLICATIONS

Extended European Search Report for Patent Application No. 21757295.7, Mailed Feb. 16, 2024, 8 pages.
Korean and English Translation of the Notice of Preliminary Rejection for Patent Application No. 10-2022-7032254, Mailed May 22, 2024, 8 pages.

* cited by examiner

ENERGY TRANSACTIONS WITH DISTRIBUTED ENERGY RESOURCES AND DISTRIBUTED GRID MANAGEMENT

PRIORITY

This application is a U.S. National Phase application under 35 U.S.C. § 371 of International Application No. PCT/US21/18625 filed Feb. 18, 2021, which in turn is based on, and claims the benefit of priority of, U.S. Provisional Application No. 62/978,246, filed Feb. 18, 2020.

FIELD

Descriptions herein are generally directed to an electrical power grid, and more particular descriptions are directed to energy transaction sharing in a power grid with distributed management.

BACKGROUND

The traditional power grid was built around the distribution of power from a central power source under the control of the utility. Such a network structure has worked well enough to produce an expectation of reliable electrical power delivery, day or night. In our world of constantly changing technological advances, the reliability of electrical power delivery from the grid has become increasingly important to power the ubiquitous adoption of consumer electronic devices. Today's society runs on, and relies on, these electronic devices.

However, there are fundamental inefficiencies in a system that delivers energy from long distance, which are further manifest when increasing amounts of energy are delivered. Energy falls off with the square of distance, which makes energy production increasingly inefficient the farther away the consumption is from the production. Thus, increased consumer energy consumption requires an exponentially increasing amount of energy production from a central generator, which compounds the inefficiencies.

The grid has made some adaptation with smaller, distributed generators closer to consumer neighborhoods. Consumer electronics have made perhaps even more adjustments by focusing on energy efficiency. Even with improvements to generator design, generator distribution, and improved management by the grid, and energy efficiency of consumer electronics, the power grid has not kept pace with the energy requirements of an increasingly technological society.

Recent interest in green energy has seen the deployment of gigawatts of renewable energy resources, which was expected to address the increased energy demands and even reduce the amount of traditional energy generation required. There are two types of distributed renewable energy sources: renewable energy plants under direct control of the grid; and, consumer energy production resources.

Renewable energy power plants are controlled much the same as any other power grid generator. Renewable energy plants tend to be relatively expensive to build and have uneven production: solar plants only produce power when there is sunshine; wind farms may produce different amounts of power when the wind speed changes. Carbon-based production is more controllable than renewable plants. The capital costs and uneven generation of renewables means the utility has less incentive to rely on renewable resources than on traditional carbon-based generation.

Thus, the focus of renewable energy resources has been at the consumer premises, meaning the introduction of energy production resources controlled by the consumer and not controllable by the grid or shareable with other consumers. However, distributed renewable energy resources at the consumer actually have a tendency to be disruptive to grid stability rather than providing energy production that improves the power grid. The average consumer has no visibility into the grid infrastructure and overall stability, but sees high incentive with the promise of "free energy." Thus, there has been a continued increase of renewable generation at the consumer premises.

Even with both types of renewable generation seeing more and more adoption, they have not created the expected green energy revolution that reduces the reliance on carbon production. Thus, the changes to the power grid have so far fallen short in development and integration of energy production with green technology that can improve the realtime energy market. Technology improvements of the grid and the deployment of renewable energy resources have not stopped the growing reliance on carbon-based energy sources. The promise of renewable energy resources reversing our reliance on carbon production has so far been an unfulfilled dream.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
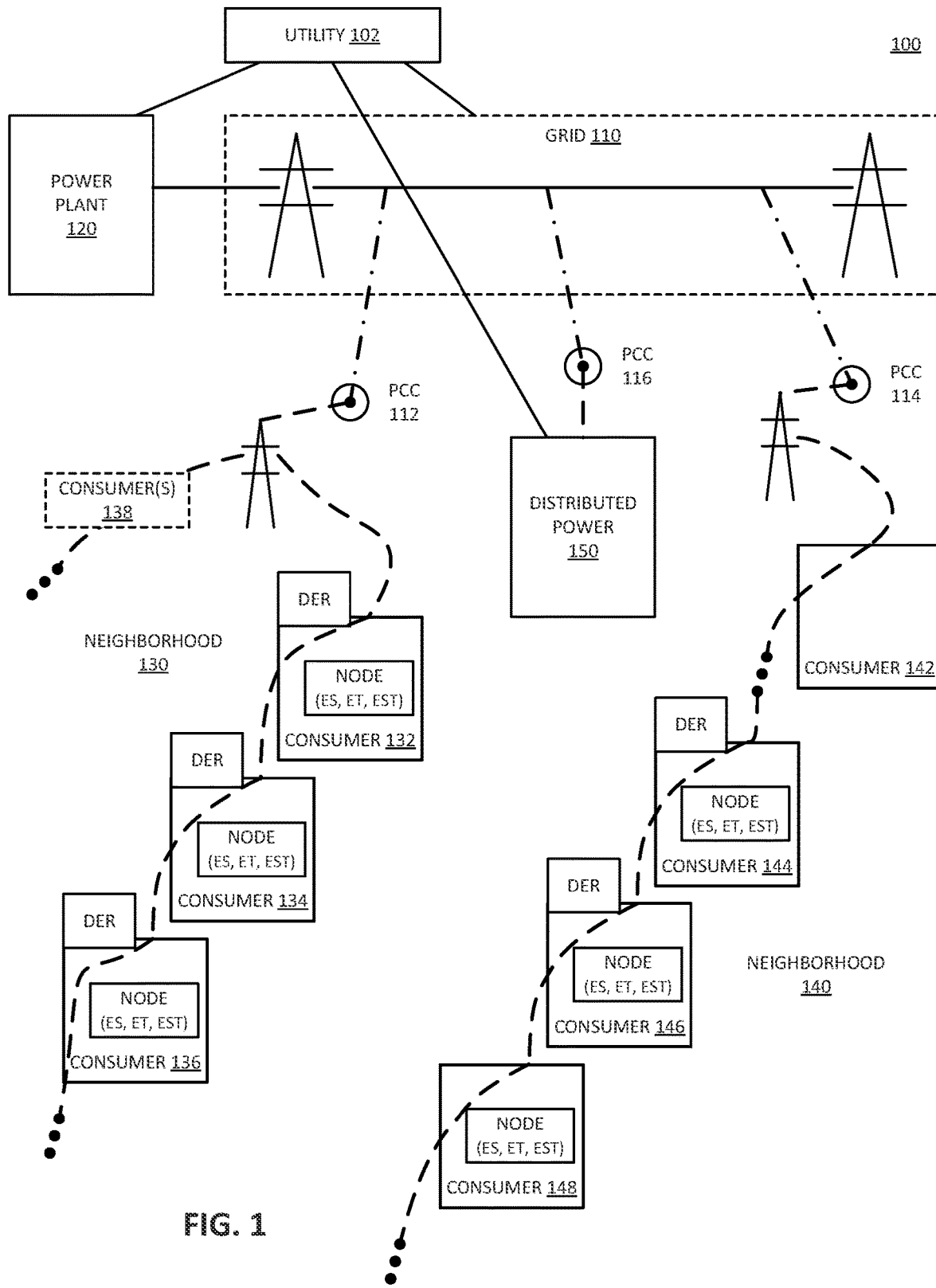
FIG. 1 illustrates an example of a system with distributed control nodes to perform monitoring and control of consumer nodes based on energy services and energy service transactions.

Descriptions of certain details and implementations follow, including non-limiting descriptions of the figures, which may depict some or all examples, and well as other potential implementations.

DETAILED DESCRIPTION

An energy grid network includes multiple distributed energy resources (DERs) or DER nodes. A DER node includes a local energy source and a local energy load. The DER nodes in the network generate realtime data about energy availability from local energy sources and realtime data about energy demand. The DER nodes can share the realtime data with other DER nodes in the network to provide a constant view in the network about the energy generation and energy demand within the network. The shared realtime data can be scaled at each DER node based on physical distance, time to exchange energy between nodes, or both distance and time. A DER node generates its own realtime data and receives data from one or more other DER nodes and determines the value of energy use from local or non-local sources by local and non-local loads.

The promise to the consumer of "free energy" as mentioned above has caused a significantly increased focus on consumer-based renewables for energy production, the most common being solar installations. Consumer energy production generates power close to where it will be used, which would seem to benefit the power grid by reducing the load on the grid. However, traditional consumer-side production is not dispatchable like a traditional power generator, and the utility cannot make use of the consumer-generated energy in the same way as energy from a normal generator. In contrast to traditional systems, the DER nodes herein are dispatchable and can provide on-demand services to the grid.

The power demand at a consumer premises includes real power demand and reactive power demand, and consumer energy generation is traditionally limited to real power production. Modern appliances and consumer electronics increase the reactive power usage in a consumer premises as well as adding harmonic noise. The reactive power and harmonic noise support must traditionally be provided by the power grid. Traditional solar installations do not cure the problem, and under certain circumstances, can amplify the issues of harmonic noise and reactive power imbalance.

Traditional consumer energy production only produces real power and may produce more real power than is needed at the local consumer premises. If the renewable power system produces excess real power, either the real power is put back onto the grid, requiring additional reactive power support, or some of the energy is consumed to perform reactive power loading with power factor correction at the customer premises. An alternative is to temporarily shut off the renewable energy production at the consumer premises to prevent the backflow of real power onto the grid. Real power flow from the consumer premises to the grid can destabilize the balance of real and reactive power produced by the utility to maintain the electrical power of the power grid at expected levels.

Some consumer systems are set up with power factor correction that includes adjustable reactive power loading that can change the power factor as it appears at the connection point of the consumer to the grid (the customer premises PCC). The PCC is the point of measurement by the utility. Power factor correction is traditionally an energy sink, in contrast to power generation where energy is produced. The reactive power loading for power factor correction consumes reactive energy to adjust the power factor as seen by the grid, and decreases the overall energy efficiency of the system, even though it shifts the power factor for the consumer premises. The reactive power loading requires the grid network to perform and control all reactive power generation even with renewable energy generation at the consumer premises.

When a consumer installs a renewable energy production system with the expectation of "free energy," the consumer typically does not consider the effect of the local real power generation on the grid. The consumer typically does not know anything about the need and control of reactive power in the power grid, nor have any idea that the local renewable system may cause a disruption to the grid. The consumer usually expects to be able to sell power back to the grid, not understanding that the grid may have an excess of the real power generated by the local system. Furthermore, where a significant amount of traditional solar is installed within the same segment of the grid, "solar saturation" may prevent additional solar installations, or require restrictions on a consumer solar installation, which further prevents the consumer from selling power back to the grid. Solar saturation is based on the ability of the grid to provide reactive power support when the solar systems are producing the maximum amount of real power to the grid.

Many traditional systems, especially large commercial installations, include additional equipment to address "power factor correction," through which the reactive power loading is changed on the consumer side to present a unity or near-unity power factor (PF) at the PCC. It will be understood that changing the reactive power loading, even if successful in balancing the power factor, will consume additional energy, which is converted into heat at the filtering equipment.

In contrast to the traditional reactive power disruption of consumer power generation and in contrast to the reactive power loading of traditional power factor correction, the DER nodes herein provide reactive power injection. The DER nodes are capable of injecting energy into a node to adjust the reactive power as seen at the node. Reactive power injection will also correct power factor, but will do so by introducing the reactive power needed, resulting in less overall system energy use, as opposed to shifting the loading which converts energy into waste in an attempt to balance power factor. There is a fundamental difference in adjusting the operation of the energy itself (e.g., generating a different current sine wave) instead of simply trying to manipulate a measurement of the power (adjusting loading to change the V*I*pf).

All considered, a producing consumer (or "prosumer") may have expectations regarding cost savings or the ability to sell power back to the grid, but the expected financial benefits to a prosumer may come at a disproportionate cost to the utility. A disproportionate cost refers to a situation where the financial benefit to the prosumer does not reduce the cost of generation and control to the utility by a comparable amount. The cost to the utility is not necessarily about the loss of a paying customer, but the increased cost to the utility to support and stabilize the grid so that the consumer can have the privilege of not paying the utility for energy production. Consequently, consumer-based renewable energy production that is completely consumer focused can pit the consumer against the grid operator instead of benefiting the grid network as a whole.

Introduction of battery storage at the consumer, which has been referred to as a "prosumager", or prosumer that also has storage, can further complicate all the issues discussed above. Battery power is inherently DC (direct current), and has been treated like traditional solar, able to generate real power only. Whether solar power or battery power, the power converters or microinverters of the DERs herein can generate native reactive power output.

As mentioned previously, consumer electronics have responded to increasing energy demands with a focus on energy efficiency, typically achieved by the use of switching power supplies. But the focus on green energy is more than the use of more efficient power supplies. There is a great interest the use of electric vehicles, with many on the road, and many more such vehicles that have been announced. Electric vehicles charge their batteries from plugging into the grid, often at night in off-peak charging times. However, there are more and more charging stalls being installed in commercial areas, which tend to be used during peak hours instead of being used at night in off-peak times. The increase in the number of electric cars on the road will necessarily increase the load on the grid. What many do not recognize is that the grid is often loaded to capacity already. The grid is already loaded almost to capacity and the load on the grid from electric vehicles connected at peak hours is expected to rise significantly, posing the risk that the grid will be unable to support the inevitable increase in demand. Dumb solar on a customer roof typically will not offset the load caused by an electric vehicle, and many purchasers of electric vehicles do not have solar systems.

Thus, the adoption of green technology can unexpectedly increase load on the power grid and can also result in unseen costs that can be disruptive to the grid. However, there are also unseen opportunities with green energy generation that can help stabilize the grid. One of the problems with current renewable energy systems is that there is limited visibility of its capabilities beyond the PCC. With the right technology to provide visibility and accessibility to consumer-based renewable energy production, distributed consumer energy production can become an invaluable resource to power and stabilize the power grid.

The microinverter and power converter technologies enable DERs to turn traditional renewable energy resources into controllable, dispatchable resources, with the result being that the use of renewable energy can provide a benefit to the grid infrastructure. As described herein, distributed consumer energy generation can become visible beyond the PCC. Not only can consumer energy generation resources be visible beyond the PCC, they can be accessible both for DER aggregation and for energy transactions. Distributed energy resource (DER) aggregation refers to a system that can aggregate energy production of multiple generation resources to use collectively to participate in the open energy market. In addition to DER aggregation, energy transaction technologies can enable the shared distribution of energy resources among peers on the grid network, and the recording of energy generation and use.

With traditional systems, consumers can choose to turn the lights or the power-consuming devices on or off. Even with traditional solar, the consumer only has the option to either turn the lights on or off; it is just that with a traditional solar system, the consumer's bill may be lower. With technologies described herein, the consumer can configure the operation of the system to have other options, such as not having to turn off the lights, or participating in energy markets.

Standard renewable interconnection can be replaced with intelligent devices which are accessible to the grid, for both dispatch and control, as well as for the participation in the energy markets. Intelligent devices provide realtime data with new capabilities to monitor the realtime operation related to energy generation and consumption behind the meter. Reference to operation behind the meter refers to operation on the consumer side of the PCC, behind a grid meter that monitors energy through the PCC to charge the consumer for grid power. Seeing the operation is behind the meter, it is not recorded by or seen by the utility meter.

Control hardware controls the operation of the smart inverters that convert energy into a mix of real and reactive power, and the control hardware can implement algorithmic control that accounts for realtime data monitored within the system. The conversion of energy into real and reactive power includes converting real power from a local source into an output of real and reactive power. The local source can be real power generation or energy storage. The conversion of real power into reactive power can be referred to as reactive power injection because reactive power is natively generated as energy generation instead of simply creating a reactive power filter that consumes power or sinks power to shift the power factor. The smart inverters can also receive real power from the grid, looking like a real power load on the grid through the PCC, and convert the real power into reactive power on the consumer side (i.e., behind the meter) to counter reactive power demand on the consumer side of the PCC. The grid will only see a real power load, while the power converter will provide reactive power locally to the consumer side.

The operation of the control algorithms can be referred to as occurring on a consumer-side control point, to control a node within the consumer side. The control point can account for a variety of conditions at a monitored node. The node can include a connection point to a load, a connection point to an energy source, a connection point to an energy store, or a connection point to a PCC, or a combination of these.

The control point determines how to use energy based on computations dependent on various factors for the control node. The factors can include local capacity, local real power demand (kWh), local reactive power demand (VA), local generation capacity, local energy storage capacity, neighborhood demands, dispatch information, or other factors. In one example, the computations can include the performance of computations that have a data factor that accounts for a rate of dissipation or a factor to account for the time value of energy generation and consumption. In one example, the computations can include the performance of computations that have a data factor that accounts for a rate of dissipation or a factor to account for the distance value of energy generation and consumption. In one example, the computations can include the performance of computations that have a data factor that accounts for a rate of dissipation or a factor to account for the time value and the distance value of energy generation and consumption.

FIG. 1 illustrates an example of a system with distributed control nodes to perform monitoring and control of consumer nodes based on energy services and energy service transactions. System 100 represents a distribution environment for a utility grid. System 100 supports DER aggregation and energy transaction management. Grid 110 represents the grid infrastructure, which can include a central generator or power plant represented by power plant 120, which is managed by utility 102. Utility 102 can perform central grid management or central grid control. System 100 illustrates two neighborhoods, neighborhood 130 and neighborhood 140, but it will be understood that any number of neighborhoods can be included in system 100. Neighborhood 130 can be considered upstream from neighborhood 140, given that it is closer to power plant 120 than neighborhood 140.

Neighborhood 130 and neighborhood 140 can represent any segment or sub-segment of the grid. The neighborhoods connect to the grid via a PCC, which is the connection point for the neighborhood. Neighborhood 130 couples to grid 110 via PCC 112, while neighborhood 140 couples to grid 110 via PCC 114. In one example, neighborhood 130 and neighborhood 140 could couple to grid 110 through the same PCC. The grid management can monitor the neighborhoods at the PCCs.

It will be understood that a neighborhood can include any number of consumers, whether fewer than what is shown or many times as many as shown. The neighborhoods can include any number of consumers that do not include local power generation and any number of consumers that do include local power generation. Thus, a neighborhood can include any mixture of consumers that do and do not include local power generation. In one example, a neighborhood can refer to a segment of power consumers connected to the grid that has independent control of power consumption and return of power back to the grid.

Power plant 120 represents a large-scale power plant that powers the grid backbone. A large-scale power plant is traditionally a hydroelectric dam generator, a nuclear power plant, a coal-powered generator plant, or a large wind farm. Recent large-scale solar farms have also been added. Some form of any of these types of power plants can be included in smaller form as a distributed power plant, connected to the grid infrastructure with its own PCC. Distributed power 150 represents a distributed power plant, shown downstream from neighborhood 130 and upstream from neighborhood 140, connected to grid 110 via PCC 116. Distributed power 150 can be located anywhere in system 100. Typically, a distributed power plant will provide power downstream. Thus, distributed power 150 could provide power to neighborhood 140 without necessarily providing power to neighborhood 130.

Reference to "downstream" refers to devices or items that are farther away along the path of distribution. Thus, a residence or customer premises can be at one point on the distribution path of the grid, and a customer premises further along the distribution path is downstream. Upstream refers to looking in the opposite direction as downstream.

The grid infrastructure of grid 110 includes towers, lines, transformers, substations, and other infrastructure to interconnect consumers to power plant 120. The grid infrastructure can be said to have a grid backbone that includes grid infrastructure with high voltage power lines that transport power many miles. In practice, multiple power sources or power plants can be connected to the same grid backbone. The grid backbone includes power distribution hardware that is traditionally designed for one-way distribution of power from the power plant to the consumers. Reference to "the grid" or a "utility grid" can refer to the combination of the power plant and the infrastructure of the grid, which can include grid management of utility 102.

System 100 illustrates customer premises, labeled as "consumers." The customer premises can be referred to as consumers or consumer nodes. In one example, customer premises can include homes, businesses, parks, loads, thermostats, pumps, vehicle charging stations, or other consumers of power, or a combination of power consumers. Each customer premises includes one or more loads or devices that rely on electrical power to operate.

Neighborhood 130 illustrates a grid segment where each consumer on one branch of the neighborhood is a power generating consumer, or prosumer. One or more or all of the consumers could be prosumagers. Consumer 132, consumer 134, and consumer 136 represent consumer premises that include energy generation resources represented by the DER on each consumer. Consumer 132, consumer 134, and consumer 136 also include a control node, represented by the Node at each consumer. The DER enables the consumer to provide energy to be used for reactive energy injection into the consumer node or into the grid, or both.

The control node includes a distributed control intelligence. As illustrated, the control node can provide energy services (ES), energy transactions (ET), energy services transactions (EST), or a combination of ES, ET, and EST. Such transactions are described in more detail below. In general the various transactions are related to sharing real-time data among peers. Typically, a control node includes a consumer-side meter and one or more smart inverters or microinverters or power converters that enable the generation of a mix of real and reactive power from the energy provided by the DER.

Neighborhood 140 includes a mix of prosumers and consumers that do not have DERs. As illustrated, consumer 144 and consumer 146 include a DER and a control node, similar to the nodes of neighborhood 130 described above. In one example, consumer 142 does not include a DER or a control node. In one example, consumer 148 includes a control node but no DER. A control node can include a consumer-side meter and one or more power converters; even without a DER, the consumer premises with a control node can provide a mix of real and reactive power behind the grid meter for loads at the consumer premises. The mix of real and reactive power can be generated by pure real power provided by the grid. Thus, the control node can convert real power from the grid into a mix of real and reactive power for consumption at the consumer in a way that the grid meter will only register real power consumption.

In one example, neighborhood 130 includes one branch of consumers that are all prosumers, and another branch of consumers that can be either mixed between consumers and prosumers or has only consumers without control nodes. Consumers 138 represent the additional branch of consumers within neighborhood 130. It will be understood that reference to a consumer that does not have a control node refers to a consumer that does not include a control node as described herein. Thus, for example, consumer 142 could have a solar installation and have local control over the solar installation and interconnection with the grid. However, without the control node described herein, consumer 142 with such a system would not be able to participate in distributed energy resource aggregation or participate in energy transactions.

Reference to looking from the grid side, or seeing from the grid side refers to what net power demand (either power needed or power produced) exists at a PCC as seen with grid monitoring or grid metering resources. Seeing from the grid side can also refer to what phase offset or reactive power net exists at that point looking downstream into the PCC. It will be understood that looking into an electrical circuit can appear different when looking into the point from different directions.

For example, a PCC that includes a consumer can include multiple circuits (e.g., through a breaker panel). The different circuits can have different reactive power requirements, which combined at the PCC connection point of the consumer to the grid can appear to have a desired power factor when seen from the grid side through the grid meter, but each circuit may have different reactive power needs. The grid can provide reactive power to the PCC to address net reactive power needs. However, being able to see into specific circuits behind the grid meter can enable a control node at the consumer to provide specific reactive power needs for different circuits and reduce or eliminate the need for reactive power from the grid.

Each customer premises is, or includes, a load, which consumes power. Loads can generate a demand for power that has a real power component to the demand and a reactive power component to the demand. Traditionally, reactive power has been provided by the grid, with the exception of heavy equipment (e.g., capacitor banks or inductive motors) on-site at the customer premises. Loads can be any form of load, such as lighting, computer equipment, entertainment devices, motors, HVAC (heating, ventilation, and air conditioning) equipment, household and kitchen appliances, or any other type of device that requires electricity to operate. Such devices can include rechargeable devices that are charged by plugging to a power outlet. Many of these devices generate reactive demand. That demand for reactive power will be seen at the PCC for the load, and can be seen upstream at other PCCs unless the demand is satisfied. In one example, the control nodes include power converters that can provide reactive power for loads.

In one example, each control node includes a metering device or energy meter built into or associated with or part of the control node. The energy meters can simply be sensor devices that measure power demand. In one example, the energy sensors can measure power demand in four quadrants, which can be referred to as a 4-quadrant meter. In one example, the metering device can measure energy signatures. Each converter can control the power usage at its PCC or connected electrical node. In one example, the converter controls the use of real and reactive power at the connection point.

The DERs can be or include any type of local source of energy. Solar and wind generation are common local power sources. Such sources are typically referred to as "power" sources because they generate power that can be used locally or returned to the grid. However, traditional systems regulate the output of the sources in terms of power, or voltage times current ($P=VI$). Such traditional operation fails to consider that energy can be more flexibly used if not fixed to a specific current or specific voltage. Regulation of the power necessarily results in wasting power. The power converters and microinverters as described herein can convert the energy generated by energy sources into any type of power needed, whether real, reactive, or a mix. The energy can be generated for local consumption at the consumer, or provided back to the grid.

With multiple consumers having control nodes, system 100 includes a control architecture that allows for control of local nodes and data sharing among peer nodes. The control architecture includes energy services (ES) (such Apparent Energy Services (AES)) as a control framework within a specific control node for a specific consumer premises, energy transactions (ET) (such as Apparent Energy Transactions (AET)) as a control framework within a subnet or neighborhood between different consumer premises, and energy services transactions (EST) (such as Apparent Energy Services Transactions (AEST)) as a communication/documentation framework for interaction between control points.

ES allows a control point within a single unit or single component within a consumer premises to perform energy audits, manage the local operation of hardware, software, and compliance in changing regulatory environments, and perform verification and transmittal of timely data inside and outside of the local network. The control node within each consumer premises can represent one or multiple control points. In one example, the control node is the control point for the grid network.

The local network includes hardware components within a PCC or behind the meter, specifically, behind the utility meter. The local network can refer to everything downstream from the control point. In a hierarchical network the PCC can be within a point of monitoring by the utility. For simplicity, the PCC can be considered the connection point of a consumer premises to the grid, and the local network includes generation and load resources on the consumer side of the PCC.

A control point executes an ES service provider, which provides the core of EST because it provides realtime data and live control over individual nodes in the network. The nodes operate independently of each other, but can receive and respond to data from peers. The ES provides a primary building block to the system to enable the full integration of renewable resources into the grid as aggregated, distributed resources.

At its most basic level, ES provides an engine for the control point to monitor and control the operation of the local node, which can provide energy savings for the consumer premises. The control point typically monitors a customer, or a portion of a consumer premises. A consumer premises can include a building structure, ventilation (heating and cooling) unit, lighting, electric appliances, motors, pumps, or other consumer that is charged by the utility for energy consumption. Some consumer premises can include an EV charging station.

Unlike traditional solar, whose added value caps out at providing energy savings, ES can provide additional opportunities to a consumer and to the power grid in general. ES can evaluate the benefit of each action to be performed with the node. These actions include the generation of real versus reactive power, the providing of power to the local loads versus selling the power on the market, the storing versus the using or selling of energy, and other actions.

The benefit of an action can be evaluated over periods of time to determine which action provides the best overall operation of the consumer system. In some cases, saving energy for the consumer is less valuable than purchasing power for the consumer and instead providing grid support with generated energy. All operations can be evaluated for cost/benefit to provide a much lower levelized cost of energy (LCOE) through market participation and time shifting.

ES operates based on realtime data generated within the system, and based on the ability to generate reactive power to perform reactive power injection of energy into a measured point. ES operation is flexible and dynamically upgradeable. ES technology enables the control nodes to make energy use decisions solution-oriented in that they can be driven to address a specific need at the consumer or within the grid. ES makes energy use decisions customer-oriented in that they can be driven by specific decisions to maximize the economic use of the customer system. ES makes energy use a value-creation proposition in that they can be driven to address a specific need at the consumer or within the grid, which can stabilize the grid while providing the economic benefits a customer expects from a solar system.

ET enables nodes within a subnet to share information about the availability of services at specific nodes and energy needs at specific nodes within a subnet. Energy consumers have become energy prosumers, which are traditionally prevented from participation in the open energy market. In fact, the current market participants set the rules for prosumers, defining how much they can be paid, and when they can be paid. The energy market can only exist because of the consumers; thus, prosumers are part of the very group that provides financial credibility to the market.

ET enables prosumer nodes to share within a subnet, working within the financial model of the energy market controlled by utility 102. ET enables sharing among target groups, enabling them to access and improve the present energy market. The target groups represent different types of energy consumers, which can be categorized as: private households, single family house owners, flat owners, building owners/landlords, commerce and services, office building, hospitals, schools, shopping centers, industry/manufacturers, energy unstable branches with unpredictable loads and heavy electrical disruption, transportation services, or other groups, or a combination of groups.

ET connects the elements of the groups by the elements of the technology system, specifying specific targets within a subnet. In one example, the neighborhoods illustrated in system 100 are subnets. Thus, neighborhood 130 can be one subnet and neighborhood 140 can be another subnet. The sharing among nodes can match energy need with energy availability within the subnet to address the needs within the subnet neutralize the cost benefit starting with the consumer and the value of data passed in a timely manner to the energy market participants.

EST enables a consumer energy system to provide value to the market. Rather than setting the consumer against the market operators, the consumer system with the control nodes described can benefit the stability of the power grid. EST provides the tools to enable the interaction among different nodes within a subnet. Additionally, EST can enable sharing of information between subnets.

Currently, power grids can include multiple prosumers, with utility 102 having no realtime knowledge of the existing prosumers and the energy production they can provide. In traditional systems, utility 102 will operate based only on what has already happened at the consumer premises and what the capabilities of market participants are. Without realtime data on prosumers, grid 110 not only does not plan or take into account the energy produced or consumed by the prosumers, but in fact cannot account for the controllable effects prosumers can have on the grid.

With EST, control nodes can share information as part of a process that leads to energy production, management, and energy efficiency based on peer nodes. The sharing of data among peer nodes identifies a fundamental concept that traditional prosumer systems and even current energy markets do not recognize: the value of energy changes over time and distance. EST enables prosumer nodes to account for the fact that energy consumed close to production has fewer losses, and energy consumed locally on demand can maximize the benefit of the energy production by addressing local energy needs and market stability with immediately available energy. Fast response to energy needs with local energy is expected to significantly improve grid stability because what leads to grid instabilities is imbalance between energy need and energy availability over time.

Generating energy at a central source of power plant 120 and moving it many miles is very inefficient relative to generating the energy close to where it is needed. Distributed generation systems provide benefits over central power plants, but distributable generation at the points of consumption can provide benefits not achievable by traditional grid architectures. EST enables the control nodes of system 100 to share information related to need and capabilities to provide distributable generation through consumer DERs.

The EST information essentially turns energy generation and consumption into realtime grid data. The EST data can identify where needs and generation are relative to each other. Within a subnet, prosumer nodes can satisfy generation-need equations to stabilize the net view of the subnet to grid management. EST can enable peer subnets to share data and stabilize each other relative to energy need and generation. In such a system, the prosumer control nodes improve the stability of the grid while the aggregated energy resources can be active energy market participants.

As described, system 100 enables aggregation of energy resources in market groups and subnets. The aggregation maximizes the ability of prosumers to participate in the energy markets, which closes the gap between prosumers and other market participants. The described distributed infrastructure ensures that market operators have the ability to control and dispatch prosumer systems to synchronize operations for grid stability.

With EST, the prosumer systems can adapt operation to adjust for the actual local conditions at the consumer node in light of electrical conditions of the grid at the point of common coupling (PCC) of the consumer node to the grid. Typically, incentives for customer curtailment are the only actions a customer can take for any policy for grid stability. With EST, a prosumer system can change operation to give the consumer more flexibility than simple curtailment. The management of the consumer system can make the grid compliance decisions almost invisible to a consumer.

With the effects of environmental and climate changes manifesting with more regularity, there is significant social pressure to change from traditional carbon-based energy sources to renewable energy sources. However, as mentioned above, unregulated adoption of traditional renewables by consumers can wreak havoc on the traditional power grid. EST not only benefits the prosumer, but with active participation in the grid, the prosumer can benefit the utility. Instead of having a utility have to put restrictions on the adoption of consumer-based renewable energy, the utility itself is benefited from increased adoption of renewable energy that utilize the technologies described herein. Increased adoption of renewable energy has a positive impact on the perception of the utility even as it improves the operation of the grid.

Figure 2:
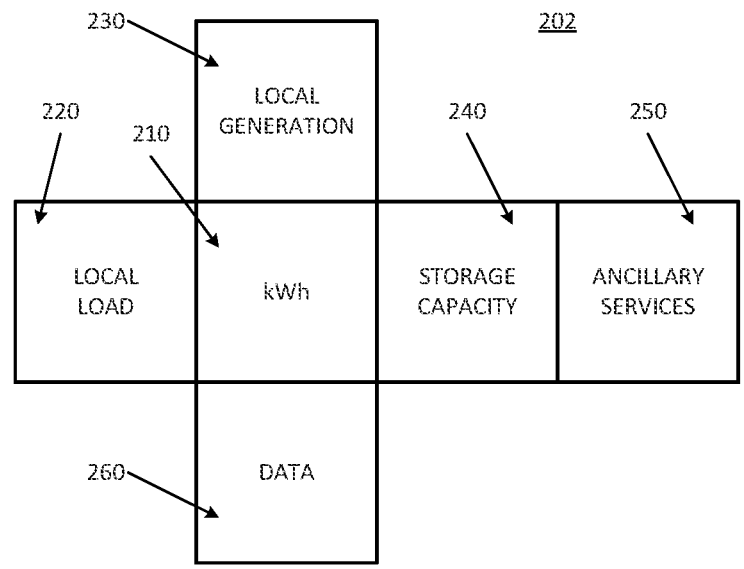
FIG. 2 illustrates one example of a representation of data computation to support a system that implements energy services transactions.
Figure 2:
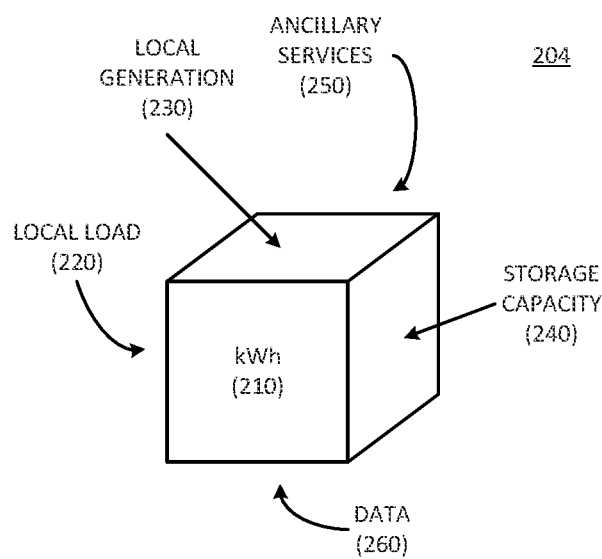

FIG. 2 illustrates one example of a representation of data computation to support a system that implements energy services transactions. Diagram 202 represents various elements of information that can be accounted for in algorithms that compute EST information. The information can be utilized, for example, by control nodes of system 100 to compute EST information. The computed information can include information shared among consumer nodes. Diagram 204 represents the same items or elements of information in a data "box," to represent the sensed and computed information in a "package" to share with neighboring nodes. The box of diagram 204 can be referred to as an EST control point, representing EST computations for components of a consumer premises.

The sharing of the information can address the traditional limitation on the inability of the grid knowing what energy generation resources are available from consumer nodes. However, just sharing energy generation throughout the grid does not necessarily provide useful information. Consider a grid network in which prosumers share with other prosumers their energy producing capacity. Without realtime information about specifically what energy production is available and how far in distance and time that energy has to travel to reach the source of realtime energy demand, the information about energy generation capacity is not very useful. The data box represented can provide realtime information between nodes in a grid network to enable accurate determinations of the effects of energy distribution from a consumer premises. Thus, the information is not just raw data, but has information that can allow consumers with excess production and consumers with demand to determine the effect of distribution within the grid network.

The information in the data box can include kWh on side 210, local load on side 220, local generation on side 230, storage capacity on side 240, ancillary services on side 250, and data factor on side 260. In one example, each item of information can be represented for demand and for energy generation capacity. The items of information can be combined as a single ES unit to describe the condition of each monitored location or each ES engine within the consumer nodes, or among nodes in a system. In one example, the items of information are separately managed for energy generation and for energy demand, thus providing a "generation box" and a "demand box". In one example, the ES unit represents an object or a container that holds the information. In one example, a consumer premises includes multiple ES engines that compute information for a specific electrical point in the consumer premises. In one example, a single aggregation of information is provided for a consumer premises, which accounts for all monitored points.

kWh represents the real power generation capacity and the real power demand of a monitored point. The local load represents the capacity under control and dispatch. Local generation can include the generation capacity of DER resources at the consumer point. Storage capacity represents a capacity of energy storage resources at the consumer point. The storage capacity can also indicate the capacity to receive energy and the capacity to provide it. Ancillary services represents grid support services provided from the consumer premises.

Data represents a data factor for each of the other items of information in the data box. The data factor can indicate a dissipation factor or a loss factor for the energy generation and energy need. The dissipation factor refers to the fact that energy is not just energy within a grid network; rather, the value of the energy to meet demand or the ability to meet demand with energy generation will depend on where the energy generation and the energy demand occur, as well as the type of generation and demand. A significant inefficiency in traditional power grids occurs due to the losses inherent in transporting energy over distance. The value of energy in time also matters, to ensure that the excess capacity delivers energy to the place of demand when the demand occurs. By providing realtime information between nodes, a node can determine based on the data factor how effectively the generation and demand will align. The data factor can operate as a proxy for the expected losses in providing the energy to meet different demands. The data factor allows consumer nodes to account for the loss over both distance and time.

For example, consider the energy generated by a solar panel. The energy produced is real power at the panel. The same energy can be converted to reactive power with a proper power converter, which can then look different at the PCC for the consumer. That same reactive energy can have more of an effect for a neighbor next door to the consumer premises with the solar panel than at a consumer that is on the next block or in a different neighborhood. In addition to the amount of energy because of transportation losses, the delivery time of transporting the energy will be different for the different consumers in the above scenario. The seconds of difference in delivery can make a difference in the efficiency of the transporting of the energy.

As such, the data box can provide local dispatch control to supplement the grid dispatch control with data driven decision-making based on data gathered locally. The realtime data gathering and sharing provides realtime energy intelligence to the grid network. With computations based on the realtime data, a prosumer system can anticipate the effect of data use to meet various demands and predict those use scenarios. The system can then compare different use cases to each other to determine the most effective use of the energy generation, for example. The system can make computations to determine how it should choose one scenario or the other, to choose a form and a shape of energy generation and transport at a particular time.

In one example, the data factor as a loss factor can operate as a computation multiplier, acting as a denominator for data computations. In addition to the shared data information in the energy services computations, in one example, the different data elements can be weighted differently for different situations. For example, different systems can value different applications of energy differently, and apply weighting to the received ES data.

Consider an example with one consumer premises generating energy from a DER. The monitoring and computation node coupled to the DER can generate a data box to indicate its capabilities and local needs, and share the capabilities with other nodes. The other nodes can likewise generate data boxes to indicate local needs and sharing capabilities. Consider different nodes that will receive the shared data. Computations for the different nodes could be as follows:

$$\sum \frac{\text{kWh} + \text{local solar}}{\text{data}}$$

$$\sum \frac{\text{kWh} + \frac{\text{local storage}}{\text{ancillary services}}}{\text{data}}$$

$$\sum \frac{\text{kWh} + [\text{local solar} + [\text{local storage} + [\text{local load} * \text{ancillary services}]]]}{\text{data}}$$

The different equations represent different focus for different nodes. The first equation can represent a system with local solar, which is will account for local demand (kWh), which can be a negative number to represent demand or a positive number to represent ability to export power, which factors the data value of received EST information. The second equation can represent a system with local storage that also has a reactive power demand, which takes into account the received EST information. The third equation can represent a system having local storage and local solar generation, factoring its own handling of local load with reactive power handling, factoring in the received EST information. It will be understood that the computation of the various equations for the various scenarios can be represented in different ways, depending on how the system performs the computations, and what is weighted or given priority at various nodes.

In general, it can be observed that energy is most valuable at its source or in the nearest surroundings. The farther away from the energy sources the energy is deliver, its value generally falls off. The data factor can be set based on time and distance factors, which can also account for the specific grid infrastructure through which the energy would pass to be transported from a prosumer to a neighboring consumer. The data factor can provide a mechanism to allow the systems to identify and make energy services available within the grid network, without needing to send specific information to the grid operator or central grid control.

A controller device, such as a computer device or processor device, of a control node can compute one or more equations based on the data box information. Not all nodes will include information for all sides of the box. Not all equations will factor all available information. In general, all computations can provide information about the value of the use of energy locally versus use at a peer consumer node. In one example, the control node through a controller can compute the value of the use of energy including local real power demand and local reactive power demand. The computations based on reactive power available from microinverters can provide significant grid stability by reactive power injection into an internal node of the consumer, which can address reactive power needs internally and obviate the need for reactive power support from the grid.

In one example, the control node through a controller can compute the value of the use of energy from a local energy source, including determining a mix of real and reactive power the local microinverter can generate for local consumption by a local load. Such computations can calculate the value of using local energy generation (i.e., using energy from local renewables or using energy from local storage) for local loads, which can include real and reactive power generation and consumption.

In one example, the control node through a controller can compute the value of the use of energy from a local energy source for use by a peer node. Such computations can calculate the value of using local energy generation (i.e., using energy from local renewables or using energy from local storage) for peer loads of external nodes, which can include real and reactive power generation and consumption.

Figure 3A:
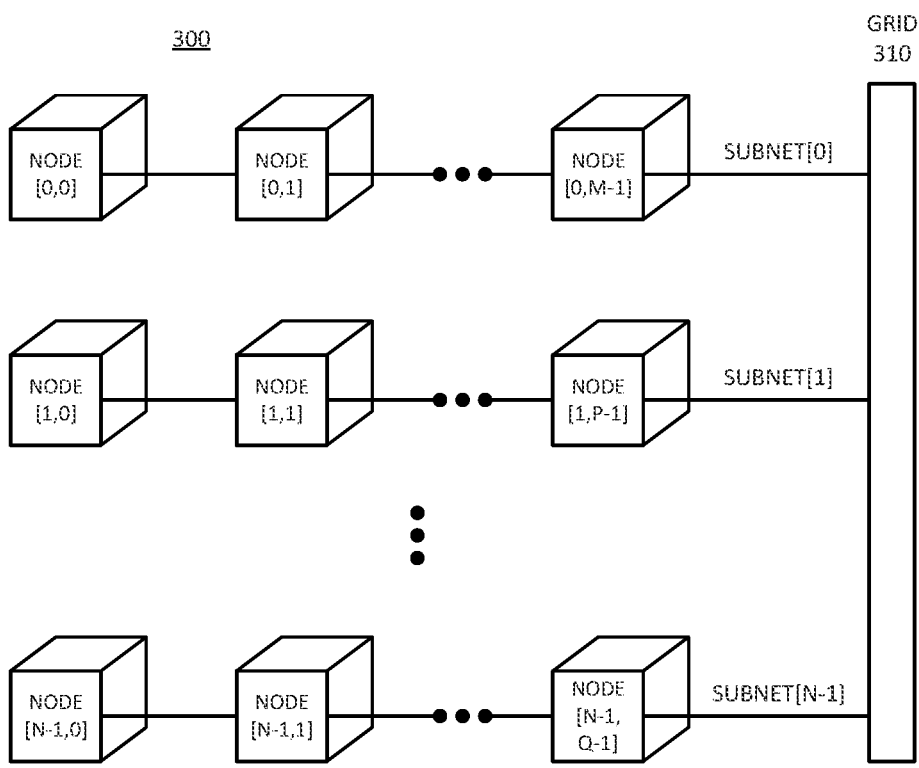
FIG. 3A illustrates one example of energy service transaction data sharing among nodes within subnets and between subnets within a grid network.

FIG. 3A illustrates one example of energy service transaction data sharing among nodes within subnets and between subnets within a grid network. System 300 represents an example of a grid network in accordance with system 100. System 300 more specifically illustrates the data sharing among different subnets. Thus, the nodes of system 100 are represented as energy consumers, and the nodes in system 300 are represented as data sources, with the data representing the energy services available for sharing or energy services needed as demand at specific nodes.

Thus, the "data boxes" illustrated in diagram 202 and diagram 204 can be connected to other data boxes within a subnet, or between subnets. The subnets represent portions of the utility grid network. In one example, the subnets represent neighborhoods. In one example, the subnets represent portions or branches of neighborhoods. Grid 310 represents the grid infrastructure of system 100. The subnets connect to grid 310 through subnet PCCs, which are not specifically illustrated in system 300.

In one example, the various subnets can include energy consumers that are not represented in system 300. System 300 represents consumer premises that can participate in EST. Subnet[0] illustrates M nodes, Node[0:M−1]. Subnet[1] illustrates P nodes, Node[0:P−1]. Subnet[N−1] illustrates Q nodes, Node[0:Q−1]. Each of N, M, P, and Q represent integer values. Any of the values can be equal to any of the other values, or all values can be different. System 300 illustrates that different subnets can include different EST-compliant nodes.

Energy transaction (ET) allow each node to compute a decision. A node can connect to the grid, for example, at a breaker box, which is the PCC for a consumer premises. The node can refer to a control node as described above. The subnet can represent a group of consumer premises or a neighborhood, which can connect to the grid through the PCC of a transformer or substation.

For each node, the nodes can compute the data information energy services transactions based on what is described above. Energy services (ES) can represent computations within a node for the determination of how to share energy resources or how to address energy need within a node. Energy transactions (ET) can represent computations within the subnet about how data within a subnet is computed. Energy services transactions (EST) can represent how data is transmitted among nodes in different subnets. In one example, EST can represent the sharing of data among nodes within the same subnet as well as the sharing of data among nodes in different subnets.

Subnets and the interconnection of consumer premises exist in traditional systems, but in the traditional grid there is no data to indicate where energy fed back into the grid is used. Traditionally, a consumer premises cannot see past the utility side of the PCC. The utility meter indicates energy in and out, but does not indicate where excess energy goes. With the EST information, the various control nodes can have an indication of what demand and energy sources are available.

In one example, each node in system 300 will compute multiple formulas. In one example, each consumer premises will run multiple EST computations based on information in the data boxes of diagram 202 and diagram 204. A single control node can execute different formulas that prioritize different uses of energy. For example, one node can prioritize kWh, another can factor energy storage, another can prioritize local reactive loads, and so forth. The system can dynamically determine through the different computations which is a more effective use of energy resources.

It will be understood that the closer a control node is to another control node on the grid network of system 300, the faster energy can be transferred between the consumer nodes. Thus, system 300 can apply scaling factors or data factors to the shared data to reflect the relative distance or the relative time to transfer energy. Relative distance will increase losses due to impedance. Relative time will decrease the value of energy from a realtime demand. The quicker a realtime energy demand can be met, the lower the impact the demand will have on the grid stability. Thus, factoring losses and the ability to respond to demand can allow the control nodes to operate with distributed intelligence at the consumer nodes, addressing realtime demand and increasing grid stability.

In one example, a control node will apply a different scaling factor for different peer nodes or external nodes that are on the same energy grid subnet, where the different scaling factors can indicate different realtime values for sharing energy between the DER nodes on the same subnet. Consider an example where Node [0,1] is a target node for an energy transaction or energy services transaction. Node [0,0] could have a different scaling factor than Node [0,M−1] due to being closer to Node [0,1].

In one example, a control node can apply different scaling factors or additional scaling factors for each hop to a different subnet the energy transaction would need. For example, a control node can apply different scaling factors to a peer node on the same subnet as to a peer node on a different subnet due to additional grid infrastructure that would need to be traversed to share energy between nodes. Consider an example where Node [0,1] is a target node for an energy transaction or energy services transaction. Node [0,M−1] could have a different scaling factor than Node [1,P−1] due to being on different subnets.

In one example, the control node can apply different scaling factors for nodes on different subnets. Consider an example where Node [0,1] is a target node for an energy transaction or energy services transaction. Node [N−1,1] could have a different scaling factor than Node [1,1] due to the architecture of the connections to the different subnets.

The control node can perform various computations based on local information and information received from peer nodes. In one example, the peer nodes share information based on a schedule of time in which information is shared. For example, the nodes could broadcast information to peers every T seconds or every T minutes, where T is an integer representing a period of time. The control nodes can compute the value of participation in grid operations (such as participation in a 15 minute market, a 1 hour market, or other market) versus use of energy services locally within the consumer node.

Figure 3B:
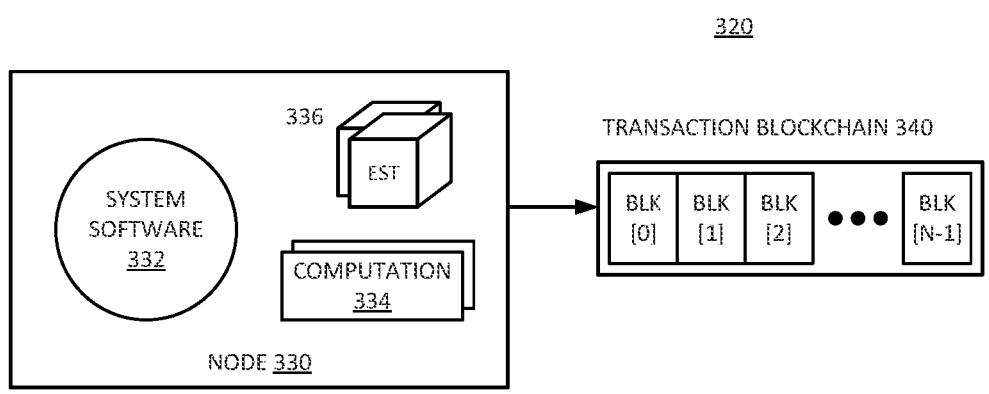
FIG. 3B provides an example of node management that records energy transactions with blockchain.

FIG. 3B provides an example of node management that records energy transactions with blockchain. System 320 illustrates control elements of a consumer node. Node 330 can include system software 332 that runs the control operations to control the hardware resources of the node. The hardware resources are not specifically illustrated in system 320, but include energy sensing hardware (such as a consumer-side energy sensor or consumer-side energy meter, or a meter behind the grid meter) and power converter hardware (such as a smart inverter or microinverter). In one example, system 320 also controls the use of energy generation resources and energy storage resources, if such resources are available at the node.

System software 332 can include one or more control routines that it executes, depending on the hardware available. In one example, the node includes security features executed by system software 332, such as firewalls or communication security, secure protocols interfaces, system check routines, or other security features. Node 330 can include communication resources to receive and respond to dispatch information. In one example, system software 332 can include interface software to provide a user interface for the user to understand usage of the consumer system.

Node 330 illustrates computations 334, which represent computations executed by the hardware resources (e.g., computer resources) that execute system software 332. Computations 334 can include computations that are part of, or controlled by, system software 332. Computations 334 can include computations such as those described above, which compute demand and available resources. In one example, node 330 generates EST information 336 to share with other nodes, and receives EST information 336 from other nodes. In one example, computations 334 can include computations at various control points for different hardware resources within node 330 to compute operations based on EST information 336.

In one example, after computing how to use energy resources based on EST information 336, system 320 can record the use of energy resources in a blockchain transaction log or transaction blockchain 340. Blockchain transactions refer to the use of an open or a widely distributed cryptographic ledger. Participants in the blockchain receive and can compute the blockchain information to securely determine what actions were taken.

In one example, system 300 utilizes transactional blockchain information of transaction blockchain 340 to certify the energy actions performed, such as the sharing of energy resources to neighboring nodes. The blockchain transactional information can allow the flow of EST information 336 and sharing of energy resources without having to go through the utility central control, while still allowing the utility to have verified log information of the actions performed. The verifiable information can be used, for example, to provide benefits through consumer insurance, or green energy credits, or to verify the fulfillment of energy agreements, or compliance with one or more regulations, or other uses.

In one example, system software 332 within a node monitors what actions are selected and what operations are performed for importing or exporting energy, and records the information to transaction blockchain 340. Transaction blockchain 340 represents B blocks of information (BLK[0:B−1]). Each of the B blocks can represents a log or transaction that was added in conjunction with an energy exchange between two consumer nodes or two DER nodes.

Figure 4:
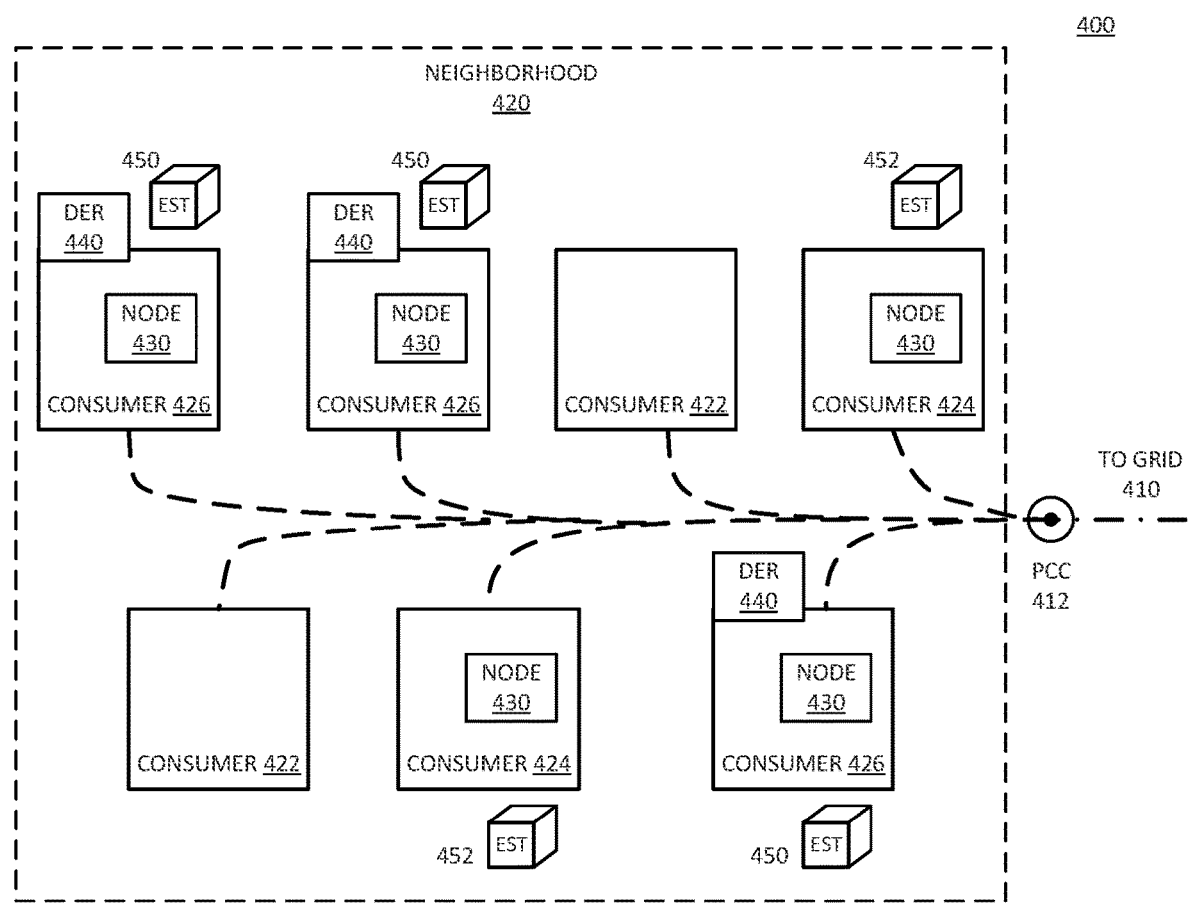
FIG. 4 provides one example of a system with distributed control nodes that manage distribution of local energy resources with energy services transactions.

FIG. 4 provides one example of a system with distributed control nodes that manage distribution of local energy resources with energy services transactions. System 400 provides an example of a neighborhood in accordance with system 100 or with system 300. System 400 represents various consumers or consumer nodes within neighborhood 420. The consumers in system 400 can be the same as those described above with respect to system 100.

An example of neighborhood 420 represents at least three different types of consumers. Consumers 426 include local DERs 440 and control nodes 430, consumer 424 include control nodes 430 that do not include DERs, and consumers 422 do not include either DERs or control nodes. The boxes labeled as "EST" in system 400 to represent energy services transaction (EST) control provided by control nodes 430, and can be referred to as EST 450. The data and the distribution of energy can be controlled in accordance with what is described above with respect to EST information. In one example, each control node 430 identified at each consumer 424 or consumer 426 is a node in accordance with what is illustrated in system 320.

PCC 412 illustrates a connection to grid 410. In one example, neighborhood 420 represents a subnet in accordance with what is illustrated in system 300. In one example, consumers 424 and consumers 426 both include control nodes, which can enable the consumer to generate and exchange EST information. In one example, control nodes 430 use the EST information to make decisions about the consumption of energy resources and the sharing of energy to neighborhood 420, a subnet, or between subnets.

Consumers 422, consumers 424, and consumers 426 in neighborhood 420 can be tied to grid 410. Consumers 424 are enabled with EST 452 and consumers 426 are enabled with EST 450, providing the capability can take advantage of EST transactions for the use of energy within the grid. In one example, consumers 426 can use EST 450 sharing to provide energy resources to the grid in a way that benefits the consumer and grid 410. In one example, consumers 424 can use EST 452 sharing to provide information about demand even when they cannot share energy resources with external nodes. In practice, there may not be any difference between EST 450 and EST 452, but they are represented differently in system 400 to represent that the EST calculations for consumer 424 cannot take into account sharing local energy generation with peer nodes. The sharing about demand can allow consumer nodes with energy capacity to provide more localized energy services than would be possible by central grid management, which simply looks to stabilize the grid as a whole, and does not have the granularity of resources needed to stabilize individual portions of the grid at the level of individual consumers or small groups of consumers.

A system in accordance with system 400 will reduce the need for capital infrastructure at the grid level, because local DERs 440 can provide the grid infrastructure necessary to stabilize grid 410. Local control nodes 430 can operate as distributed control and perform verifiable transactions that the grid management can verify without having to control. Thus, the distributed intelligence is truly distributed and self-functioning.

Figure 5:
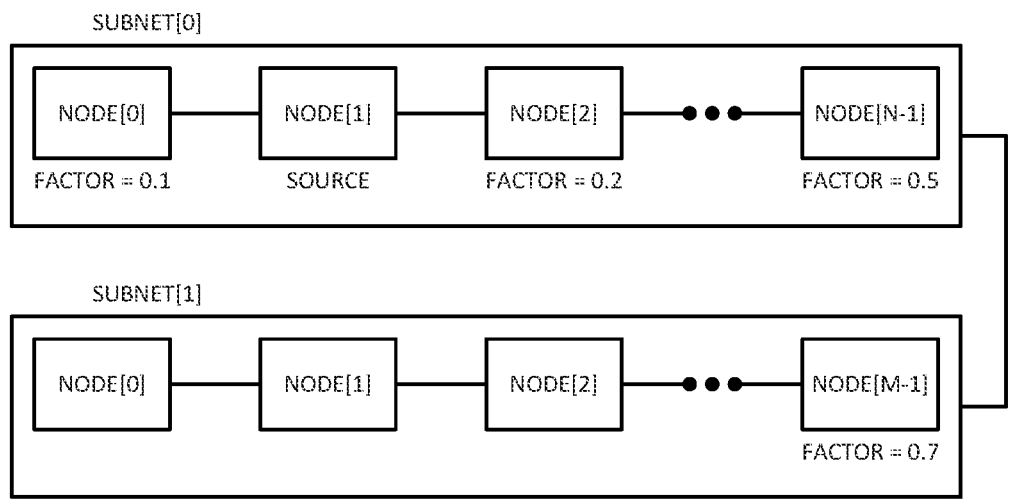
FIG. 5 provides one example of a system with distributed control nodes that use energy services transactions across subnets of a grid network.

FIG. 5 provides one example of a system with distributed control nodes that use energy services transactions across subnets of a grid network. System 500 provides an example of a system in accordance with system 400 or in accordance with system 300. System 500 illustrates two subnets, Subnet[0] and Subnet[1]. The illustration of two subnets is merely an example, and what is described with respect to the two subnets can be applied to more than two subnets.

Subnet[0] includes Node[1], identified as the "Source." Node[1] is the source in that, for purposes of system 500, Node[1] is the originator of the EST information considered in system 500. Other nodes can simultaneously be source nodes for purposes of sending EST information, but the number illustrated apply to Node[1] as the source of EST information. For other nodes, different factor values could apply.

In general, the energy resources are more valuable when the closer in time and space the consumption to the generation. Even so, the value of the energy resources could have other considerations that can affect the value of the energy resources. For purposes of system 500, consider that the lower the factor value (i.e., closer to zero), the more valuable is the energy resource. In the example of system 500, higher factor values are less valuable than lower factor values. The sharing of information could be configured differently than what is illustrated as long as calculations take into account the information configuration.

If Node[1] is the source of an energy resource, Node[2], which is a neighbor, may have a data factor value of 0.2, which Node[N−1] further away in Subnet[0] may have a data factor of 0.5. Consider an example where Node[0] is also a neighbor to Node[1] as Node[2] is, but that Node[0] has a data factor of 0.1 while Node[2] has a data factor of 0.2. In one example, the factor for Node[0] could be higher than that for Node[2], even if time and distance are relatively equal, if the distance of Node[0] from the subnet PCC is further for Node[0] than for Node[2]. In such a case, the energy resources from Node[1] can provide greater benefit to Node[0], because the alternative could be a higher energy loss, and thus increased cost to provide energy services to Node[0] from the central grid relative to the cost for providing the same services to Node[2]. It will be understood that such an example is not necessarily true in all cases, but is provided as one example.

Subnet[1] is illustrated with nodes Node[0:M−1], where Node[M−1] may have a data factor of 0.7 relative to energy services from Node[1] of Subnet[0]. Other nodes in Subnet[1] may also have data factors, which are not specifically listed. Their data factors could be higher than the 0.7 of Node[M−1]. The data factor of Node[M−1] could indicate that in certain circumstances it makes sense for the node to receive energy services from Node[1] or another node in Subnet[0], assuming other neighboring nodes cannot provide the needed services. Nodes in both subnets can compute calculations to determine the value of the energy services.

In one example, shared information is scaled by a factor based on a physical distance between the source node and other nodes. In one example, shared information is scaled by a factor based on a time to exchange energy between the source node and another node.

Figure 6:
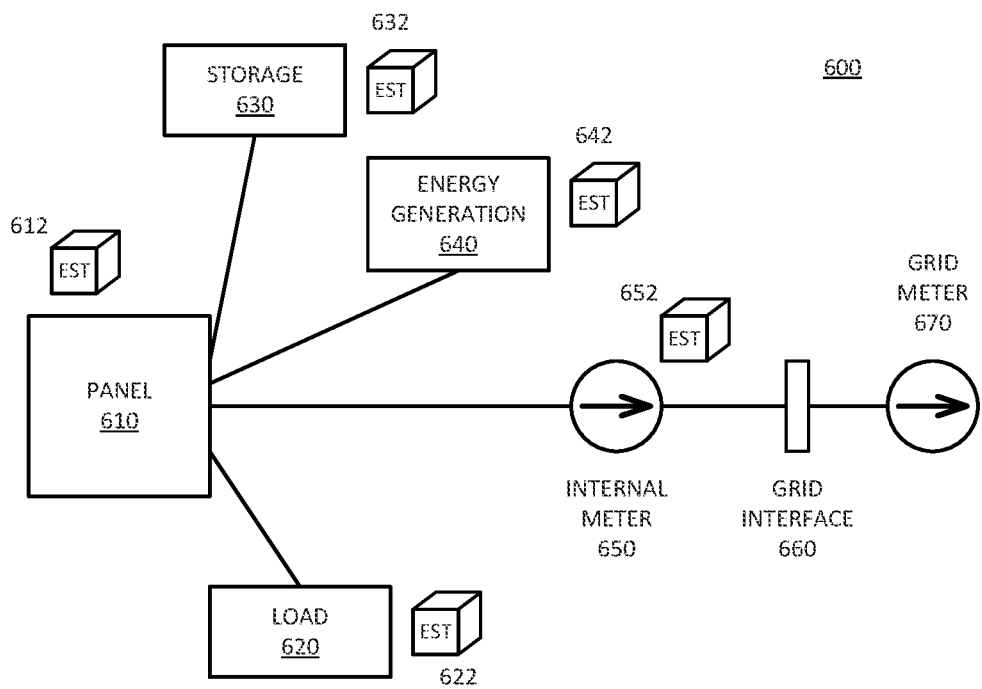
FIG. 6 provides one example of a node that balances DER resources with EST information.

FIG. 6 provides one example of a node that balances DER resources with EST information. System 600 represents an example of a node in accordance with system 400. The node can be a consumer premises in accordance with system 100 or system 200. Panel 610 can execute control in accordance with system 500.

In one example, system 600 integrates sensing hardware with analytics at a consumer premises. The sensing hardware can include energy sensing hardware to create a 4-quadrant representation of energy usage. Internal meter 650 provides an example of sensing hardware. The analytics can be executed by control hardware running control software at panel 610. Panel 610 can represent an enclosure for control hardware. In one example, the enclosure includes an integration of sensing hardware and intelligence to compute the operations of the consumer premises of system 600. For example, panel 610 can include hardware including a gateway device to execute an intelligent grid operating system (iGOS).

In one example, system 600 storage 630 to represent storage resources, energy generation 640 to represent a source of energy to address demand, and loads 620 for the consumer premises. Storage 630, energy generation 640, and load 620 are all resources behind grid meter 670, and can be monitored internally by internal meter 650. In one example, internal meter 650 includes sensing hardware pointing toward grid interface 660 and grid meter 670, and sensing hardware pointing back into the consumer premises node. Thus, in one example, internal meter 650 includes hardware to look out to the grid and hardware to look into the consumer node.

In one example, system 600 includes control to perform EST computations for each of the various resources at the consumer premises. Thus, EST 632 represents computations for storage 630, EST 642 represents computations for energy generation 640, and EST 622 represents computations for load 620. In one example, one or more of the EST boxes is combined, or the control hardware and control software can perform computations that account for multiple components at the same time.

In one example, internal meter 650 includes EST 652 to represent the computation of EST information based on what is sensed by the internal meter. EST 612 near panel 610 represents the computations by the control hardware to account for the available resources from the consumer premises. EST 612 can also or alternatively represent the realtime information to send to other nodes over the grid network.

In one example, panel 610 includes a gateway that includes internal meter 650. In one example, a gateway in system 600 performs analytics to determine how to use the energy generation and how to use energy resources from the grid to provide for local loads 620. In one example, the gateway includes security. In one example, the gateway can be connected to the utility to provide dispatch control over the local resources of the consumer premises.

Typically, a utility wants to control grid support and set configuration (like setting a power factor) for PCCs. The grid wants to see compliance with the desired configurations. The grid can set status and send out dispatch information. The dispatch information can also be a request by the grid for loads to offload power. In one example, the control of panel 610 responds to grid configuration requests and grid loading or grid load curtailment requests. The control within the consumer premises can perform actions behind utility meter 670 to show compliance at grid interface 660 without necessarily needing to perform specific requests. For example, when the grid requests curtailment of specific reactive loading, the control could adjust the reactive power output behind the meter to make the reactive load disappear from the grid monitoring by grid meter 670 at grid interface 660, without actually having to turn off the load at the consumer premises.

The consumer premises of system 600 can include EST 632 of storage 630, EST 642 of energy generation 640, EST 622 of loads 620, and EST 652 of internal meter 650 running at the same time. From one perspective, the EST information can be running for all of the elements at the same time. In one example, the node control in panel 610 computes multiple formulas to prioritize each of the different uses of energy within the consumer premises: kWh for the loads, energy generation, storage resources, and so forth. Different formulas can be computed to factor more than one condition at the same time, or compute the effect of splitting resource use.

By running the EST information for each element of the consumer system, the control can factor each aspect of loading and generation to determine how to perform energy consumption and energy generation operations that will improve the effect of the system. With intelligence at the consumer premises, the consumer premises can respond to the grid needs while being able to share data with neighboring nodes, and receive energy resources or provide energy resources to neighboring nodes without the grid management needing to supply all energy needs through a central power plant, or even distributed power plants. At least the load on the central power plant or distributed power plant could be reduced without direct control from the grid management, based on the distributed intelligence at the consumer nodes.

In one example, the consumer premises of system 600 represents a DER node with a local energy source represented by storage 630 and a local energy load represented by load 620. In one example, panel 610 can include a controller to generate realtime data about energy availability and energy demand at the consumer premises. The controller can receive EST information from peer nodes. In one example, the controller scales the received EST information based on location or time or both location and time of the peer node from which the information was received. The controller can perform the EST computations to determine whether to share local energy to the grid or use energy from the grid for local loads. The controller can make such a determination based on the relative value of the EST transactions as indicated by the EST computations.

Figure 7:
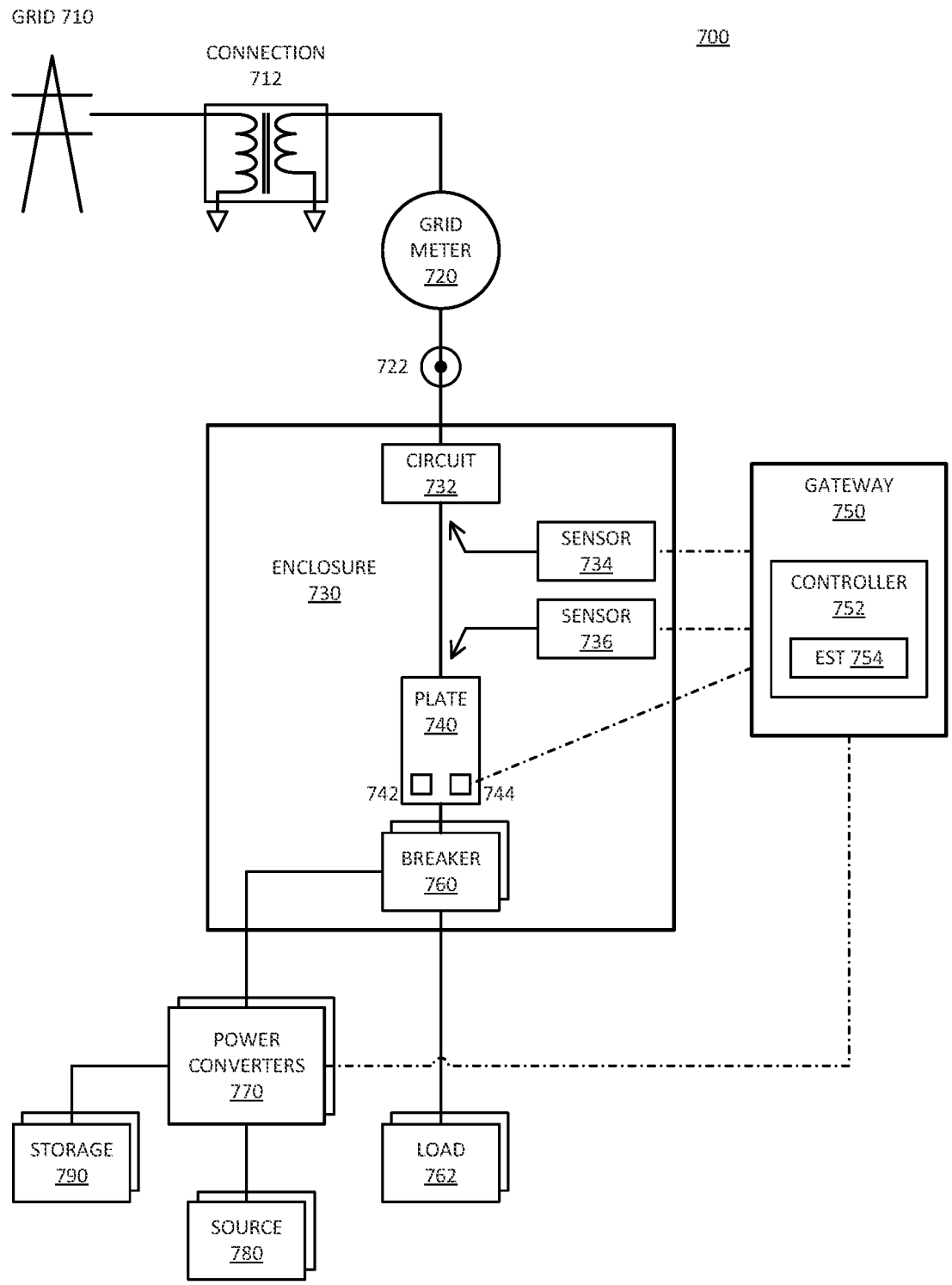
FIG. 7 is a block diagram of an example of a system with internal current sensors.

FIG. 7 is a block diagram of an example of a system with internal current sensors. System 700 provides an example of a power system. System 700 can be one example of a system in accordance with system 600.

Grid 710 represents a utility grid that provides power to consumer premises from one or more grid-managed generators, which may include distributed generators. Connection 712 represents a substation or power transformer or other infrastructure to step down the very high voltage transmission line of grid 710 to a consumer high voltage (e.g., 120 V, 220 V).

Grid meter 720 represents a grid meter, as has been described previously. The utility charges the consumer based on measurements made by grid meter 720 to monitor power delivered from grid 710 to the consumer premises through PCC 722.

Enclosure 730 represents an electrical enclosure at the consumer premises. Circuit 732 represents a connection circuit to receive the utility connection. In one example, the circuit can be a simple transmission line connection. Alternatively, isolation hardware or other circuitry can be included.

Plate 740 of enclosure 730 represents an electrical conductor to provide grid power to multiple circuit breakers represented by breakers 760. Breakers 760 represent any number of circuit breakers that can be included in enclosure 730. In one example, enclosure 730 includes sensors 742 and 744 to measure currents for electrical circuits provided by breakers 760. The sensors can be in accordance with any example herein.

In one example, enclosure 730 includes sensor 734 to monitor the connection to grid 710. Sensor 734 can be referred to as grid facing, as it measures the current waveforms as seen looking into the grid connection. In one example, enclosure 730 includes sensor 736 to monitor the connection to the electrical components of the consumer premises. Thus, sensor 736 can be said to be consumer facing, as it measures the current waveforms as seen looking into the local system at the consumer premises. In one example, there are multiple consumer facing sensors 736. Sensor 734 and sensor 736 could be referred to as meters in the sense that they monitor the power use at the consumer premises. However, they are understood to be separate from grid meter 720. Additionally, whereas grid meter 720 generally tracks measurements used to determine power usage, sensors 734 and 736 can be used to generate current waveform data. The current waveform data can enable system 700 to operate in different current zones based on comparison of the local current waveform with the grid waveform.

System 700 includes loads 762, which represent the local loads at the consumer premises. The loads are any devices (e.g., lights, heating, air conditioning, refrigeration, electronics, or others) that consume electricity to operate. Source 780 represents any energy generation device, which is a device that generates energy as it operates, such as solar or wind generators. Storage 790 represents a device that stores energy to be usable in a time-delayed manner, such as a battery.

In one example, system 700 includes power converters 770, which represent power converters in accordance with any example described. Power converters 770 can represent microinverters in accordance with any example herein. In one example, each storage device 790 has at least one associated power converter 770. In one example, each source 780 has at least one associated power converter 770. In one example, power converters 770 provide energy back into enclosure 730 to be distributed to one or more circuits of breaker 760.

In one example, system 700 includes gateway 750 to manage power usage at the consumer premises. In one example, some or all of gateway 750 is incorporated into enclosure 730. In one example, gateway 750 has a separate electrical box communicatively coupled to components of enclosure 730. Gateway 750 includes at least one processor device, represented by controller 752. In one example, controller 752 represents an embedded computer. Controller 752 performs computations to generate current waveforms and performs computations to determine how to control operation behind the meter at the consumer premises to control what power consumption is seen at PCC 722 by grid meter 720. Controller 752 represents hardware to execute an iGOS.

In one example, controller 752 executes EST computations, represented by EST 754. EST 754 represents computations that can be performed for source 780, load 762, storage 790, and power converters 770, in any combination. Thus, EST 754 represents the ability of gateway 750 to utilize EST information to determine how to interact with grid 710. System 700 does not illustrate other consumer nodes, but other nodes similar to the consumer premises of system 700 can exchange and consume EST information in accordance with any example herein. The sharing and use of EST information among consumers enables truly distributed energy generation with truly distributed grid intelligence.

The dashed lines illustrate communication in system 700. In one example, gateway 750 or controller 752 receives sensor data from sensor 734 to provide grid conditions and sensor data from sensor 736 to provide local conditions. In one example, gateway 750 or controller 752 receives information from sensors 742 and 744 to indicate current information for various specific electrical circuits in the consumer premises. In one example, gateway 750 or controller 752 provides one or more commands to one or more power converters 770 to change operation of the selected power converters. The change in operation of the selected power converters can change the consumption of power as seen from the grid side. The change in operation can generate reactive energy to inject into the electrical circuits to satisfy reactive power demand, or to inject reactive power out to grid 710.

In one example, controller 752 computes a quadrant of operation of the current waveform for the local system. Controller 752 can compute a desired quadrant of operation for the local current waveform based on a quadrant of operation of the current waveform for the grid. If the current waveform for the local system is not the desired operation, the controller can send one or more commands to power converters 770 to adjust operation. Power converters 770 can adjust a mix of real and reactive power to shift the local current waveform into the desired quadrant of operation. In one example, the power converters simply convert more real power into reactive power. In one example, the power converters convert more generated energy from source 780 into reactive energy to inject back into the system. In one example, the power converters convert stored energy from storage 790 into a mix of real and reactive energy to inject back into the system. Any of these actions or a combination of these actions can change the operation of the local current waveform to the desired quadrant.

In one example, one or more loads 762 (e.g., an air conditioner) can have a power converter 770 to manage the power consumption of a particular load. For example, certain loads 762 have a high reactive power demand. In one example, power converter 770 can draw real power from grid 710 and convert the real power locally into reactive power. Thus, rather than changing the reactive loading of the consumer premises as traditionally done, power converter 770 can draw only real power from the grid, which is electrically isolated from its output. Thus, grid meter 720 will see only real power draw by the consumer premises. However, the electrical isolation of power converter 770 between its input and output can provide a local reactive power output to satisfy the demands of a specific load 762. Thus, a reactive load can appear to the grid to draw only real power. Thus, although the connection lines go from load 762 to breakers 760, in one example, at least one load 762 could be coupled to breaker 760 through power converter 770.

Figure 8:
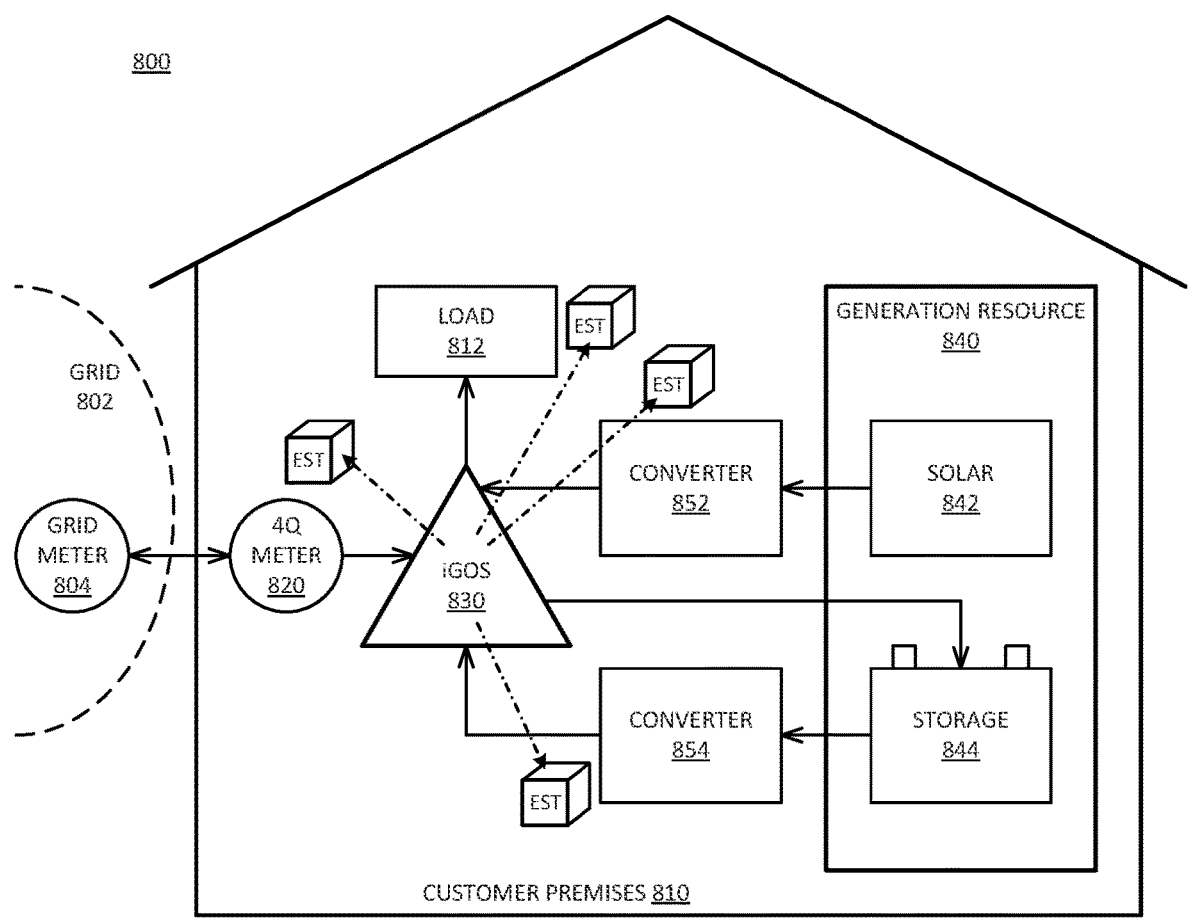
FIG. 8 is a block diagram of an example of a DER node.

FIG. 8 is a block diagram of an example of a DER node. System 800 includes customer premises 810. Customer premises 810 represents a grid consumer, and includes energy generation resources 840. Generation resources 840 can include any type of generator or renewable resource such as solar system 842. In one example, generation resources 840 include storage 844, which can store energy for later retrieval.

Customer premises 810 includes load 812, which can represent one or more individual loads for the premises, or can represent the entire customer premises. Load 812 can have a particular harmonic signature. In one example, customer premises 810 includes iGOS 830, which represents an intelligent platform for energy management of energy generated and consumed at customer premises 810. iGOS 830 can be in accordance with any example described herein. In one example, customer premises 810 interfaces with grid 802 via grid meter 804. Grid meter 804 is the meter used by the grid to monitor net power delivered to customer premises 810 to charge the consumer for power.

In one example, customer premises 810 includes an internal meter, represented by 4Q (four quadrant) meter 820. As a four quadrant meter, meter 820 can indicate not only the quantity of real and reactive power, but in what quadrant the operation currently is. More details regarding the four quadrant meter operation are provided below with respect to FIG. 10A and FIG. 10B.

In one example, solar 842 provides its power for available use by load 812 or to export to grid 802 via converter 852. Converter 852 represents a microinverter that can provide on-demand reactive power from a real power source. Thus, while solar 842 outputs DC power, converter 852 can provide AC output with any phase between the output voltage and current, by driving the current based on a reference waveform, and allowing the voltage to follow the current. Converter 852 has electrical isolation between the input and output, and the electrical isolation allows the device to impedance match both input and output by simply transferring energy between the input and output, instead of regulating a specific voltage or current. Converter 854 can be the same as converter 852, and provides a power interface to storage 844. In one example, storage 844 will include a separate converter to provide DC power to charge the battery.

Customer premises 810 illustrates three components of an intelligent platform for energy management. The first is iGOS 830 to monitor, analyze, and regulate fluctuations of energy use. The next is a converter to manage and modulate voltages and frequencies, and communicate the information multilaterally to consumers, grid operators, and utilities. The converters are capable of reactive power generation, as has previously been stated. The third includes meter 820 and iGOS 830 to perform data collection to aggregate all information from multiple sources to increase overall system intelligence and reliability. In one example, the overall aggregated information occurs only at the control center. When operating together, system 800 can provide the smartest energy decisions for the end-user at any given time, whether it is to increase renewable energy generation, reduce energy consumption, delay use of grid-delivered energy, sell excess energy to the grid, or other decision, or any combination of decisions.

Figure 9:
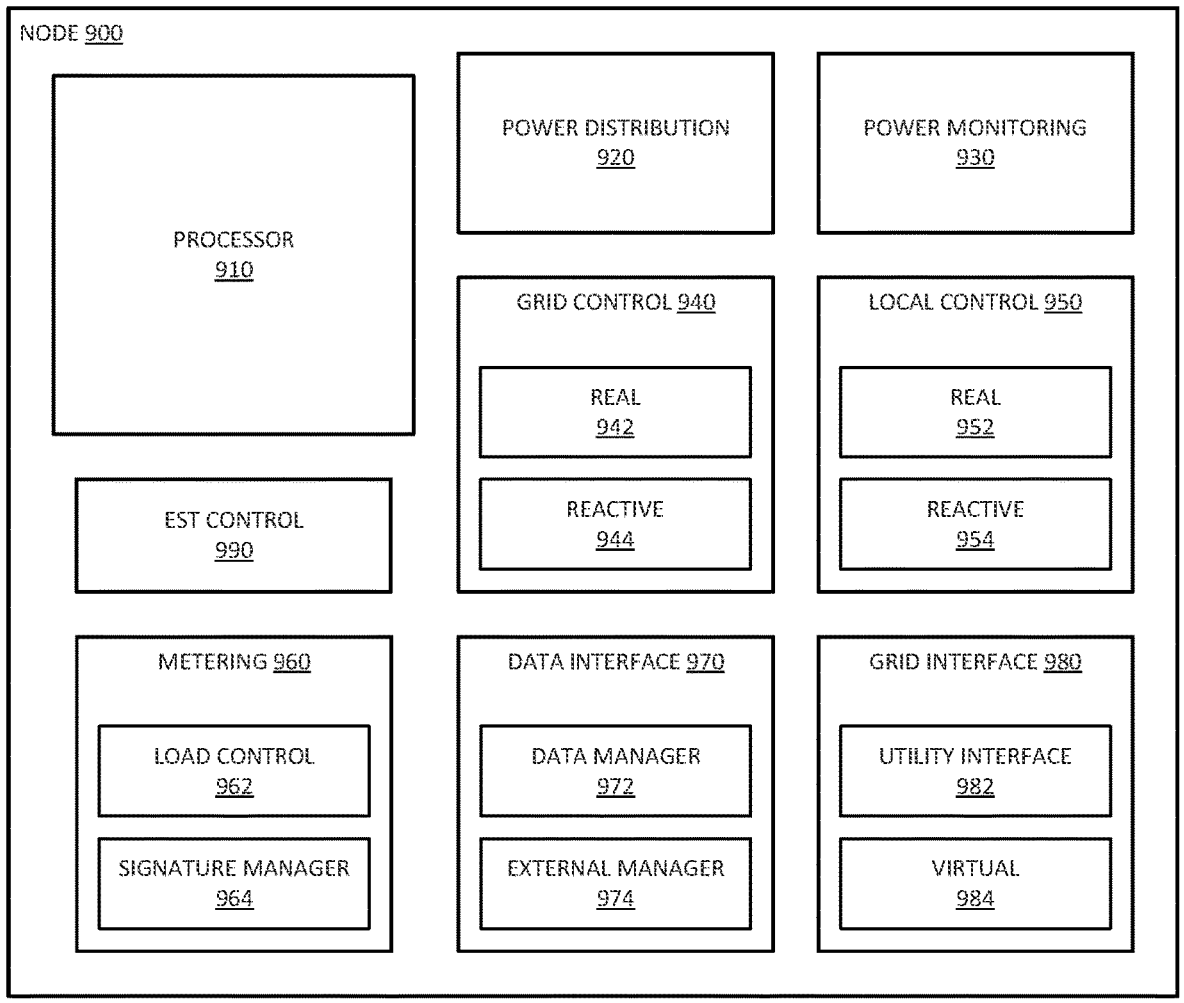
FIG. 9 is a block diagram of an example of a DER node for a distributed power grid.

FIG. 9 is a block diagram of an example of a DER node for a distributed power grid. Node 900 represents a DER node, and can be an example of a DER node or control node in accordance with any example described herein. Node 900 includes various hardware elements to enable its operation. In general, the hardware can be described as processor 910, power distribution hardware 920, and power monitoring hardware 930. Each of these elements can include specific types and functionality of hardware, some of which can be represented by other elements of node 900.

Processor 910 represents one or more controllers or processors within node 900. In one example, node 900 includes a power meter, a power converter, and control hardware to interface the two elements and couple to the grid. In one example, each separate item includes a controller, such as a controller within the metering device, and a controller within the power converter. The power converter can include a power extractor controller, an inverter controller, and another controller to manage them. Thus, processor 910 can represent one or more controllers, CPUs (central processing units), processors, or other elements of control logic that enables node 900 to monitor and distribute power.

Processor 910 manages and controls the operation of hardware within node 900, including any hardware mentioned above. Processor 910 can execute to provide iGOS for node 900. In one example, processor 910 executes logic to provide at least some of the functions described with respect to node 900. To the extent that functions described are provided by hardware, processor 910 can be considered a controller to control the operation of the hardware. In one example, processor 910 executes a DER node operating system for node 900. In one example, the operating system is iGOS.

The iGOS platform can provide computing, and general control over the operation of node 900. In one example, iGOS enables the node to collect data and make decisions to send data outside the node. In one example, iGOS can use the data to control the local system, such as the local elements coupled to a same side of a PCC. In one example, iGOS also sends data for use by external entities, such as a utility manager or other nodes in the grid network.

In one example, iGOS controls dispatch functionality for node 900. The dispatching can include providing and receiving data and especially alerts used to determine how to distribute power. In one example, the iGOS can enable autonomous dispatching, which allows the nodes of the grid network to share information among themselves that control the operation of the grid. The autonomous dispatching refers to the fact that a central grid operator does not need to be involved in generating or distributing the dispatch information.

In one example, iGOS enables control functionality. The control can be by human, cloud, or automated control logic. In one example, the iGOS enables node 900 to work independently as an individual node or work in aggregate with other DER nodes in a grid network. The independent operation of each can enable the distributed network to function without a central power plant, or with minimal central grid management.

In one example, the iGOS can enable blackstart operation. Blackstart operation is where node 900 can bring its segment of the grid back up online from an offline state. Such operation can occur autonomously from central grid management, such as by each node 900 of a grid network independently monitoring conditions upstream and downstream in the grid network. Thus, node 900 can come online when conditions permit, without having to wait for a grid operator to control distribution of power down to the node. Node 900 can thus intelligently bring its node segment back up online by controlling flow of power to and from the grid, and can thus, prevent startup issues. In one example, iGOS enables virtual non-export operation. Non-export includes not outputting power onto the grid. However, with the iGOS, node 900 can convert real power to reactive power, and continue to export power, but not of a type requested by the grid, instead of simply dumping watts onto the grid.

In one example, the iGOS enables node 900 to offer multiple line voltages. In one example, grid interface 980, which may be through control logic of processor 910, can be configured for multiple different trip point voltages. Each trip point voltage can provide a different control event. Each control event can cause processor 910 to perform control operations to adjust an interface of the DER node. The interface can be an interface to a load and/or an interface to the grid network.

In one example, the iGOS can economize interconnects within the grid network. In one example, node 900 controls backflow (e.g., through non-export) onto the grid network by limiting the backflow, or adjusting output to change a type of power presented to the grid. In one example, node 900 provides utility control functions that are traditionally performed by utility grid management that controls flow of power from a central power plant. Node 900 can provide the grid control functions to enable a distributed power grid.

Power distribution hardware 920 includes power lines, connectors, phase locked loops, error correction loops, interface protection or isolation such as transformers, or other hardware or a combination that enables the DER node to transfer energy from one point to another, to control interfaces to control how power flows throughout the grid, or other operations. In one example, a power converter can be included within the power distribution hardware. A power converter can be a smart inverter or microinverter.

Power monitoring hardware 930 includes connectors, signal lines, sampling hardware, feedback loops, computation hardware, or other hardware that enables the DER node to monitor one or more grid conditions or load conditions or both. The grid conditions can be or include voltage levels, phases, frequencies, and other parameters of the grid operation. The load conditions can be or include voltage, current, phase, frequency, and other parameters of power demand from loads.

In one example, node 900 includes grid control 940. Grid control represents hardware and logic (e.g., such as software/firmware logic, configurations) to control an interface to the grid network. In one example, grid interface 980 represents grid network interfaces. Grid control 940 can include real power control 942 and reactive power control 944. The real and reactive control can be in accordance with any example described herein. In one example, real power control 942 includes logic (hardware or software or a combination of hardware and software) to provide real power to the grid. In one example, reactive power control 944 includes logic to provide reactive power to the grid. Providing power to the grid can include changing an interface to cause power of the type and mix desired to flow to the grid.

In one example, node 900 includes local control 950. Local control represents hardware and logic (e.g., such as software/firmware logic, configurations) to control an interface to the load or to items downstream from a PCC coupled to a grid network. Local control 950 can include real power control 952 and reactive power control 954. The real and reactive control can be in accordance with any example described herein. In one example, real power control 952 includes logic (hardware or software or a combination of hardware and software) to provide real power to a load. In one example, reactive power control 954 includes logic to provide reactive power to a load. Providing power to the load can include changing an interface to cause power of the type and mix desired to flow to the load from a local energy source and/or from the grid.

It will be understood that a utility power grid has rate structures that are based on not just the amount of use, but the time of use. For example, a utility grid can have tiered rates. In one example, processor 910 includes rate structure information that enables it to factor in rate structure information when making calculations about how to change an interface with grid control 940 or with local control 950. Factoring in rate structure information can include determining what type of power (real or reactive) has more value in a given circumstance. Thus, processor 910 can maximize value of energy production or minimize the cost of energy consumption. In an implementation where tiered rate structures exist, processor 910 can instruct grid control 940 or local control 950 based on how to keep consumption to the lowest tier possible, and how to provide power at a highest rate possible. In one example, processor 910 takes into account utility or grid network requirements when controlling the operation of grid control 940 or local control 950. For example, the grid may have curtailments or other conditions that affect how power should be provided or consumed. In one example, node 900 can adjust power output as loads dynamically come online and offline. For example, local control 950 can reduce output when loads go offline, and can increase output when load come online.

Metering 960 represents metering capability of node 900, and can include an internal meter or a consumer meter behind the grid meter in accordance with any example described herein. In one example, metering 960 can include load control metering 962. Load control 962 can include logic to monitor load power demand. In one example, metering 960 can include signature manager 964. Signature manager 964 includes logic to create, store, and use energy signatures in monitoring what is happening with loads. More specifically, signature manager 964 can manage energy signatures including complex current vectors in accordance with any example described herein.

Traditionally, a net energy meter was required to connect to the grid. However, newer regulations may prevent connecting to the grid at all unless certain capabilities are met. Metering 960 can enable node 900 to control an inverter or converter to respond to specific loads or to specific energy signatures identified on the line. Based on what metering 960 detects, node 900 can provide realtime control over energy production and load consumption.

In one example, node 900 includes data interface 970. In one example, data interface 970 includes data manager 972 to control data that will be sent to a data center or data management, and data that is received from the data center or data management. Data manager 972 can gather data by making a request to a data center or comparable source of data. In one example, data interface 970 includes external manager 974, which can manage the interface with a data center, central grid management, other nodes in the grid network, or other data sources. In one example, data manager 972 receives data in response to data sent from a data source. In one example, external manager 974 makes a request for data from a data source. The request can be in accordance with any of a number of standard communication protocols or proprietary protocols. The medium for communication can be any medium that communicatively couple node 900 and the data source. In one example, external manager 974 communicates with a data source at regular intervals. In one example, external manager 974 communicates with the data source in response to an event, such as more data becoming available, whether receiving indication of external data becoming available, or whether data manager 972 indicates that local data is ready to send. Data interface 970 can enable realtime data for market use. In one example, data interface 970 provides data collection, which can be used in one example to identify currents for energy signatures.

In one example, node 900 includes grid interface 980. In one example, grid interface 980 includes utility interface 982 to interface with a utility grid. In one example, grid interface 980 includes virtual interface 984 to interface with a distributed grid network. The operation of the grid interface can be referred to as MGI (modern grid intelligence), referring to execution of an MGIOS by processor 910. Grid interface 980 can include any type of interface that couples node 900 to grid infrastructure, whether traditional utility grid infrastructure or distributed grid networks. In one example, grid interface 980 can enable node 900 to know a power direction. In one example, the grid network provides dispatch information, such as provide a signal from a feeder to indicate a power direction. Node 900 can manage its operation based on the direction of power flow in the grid network. Grid interface 980 can also dynamically monitor changes in direction of power flow.

In one example, the iGOS enables node 900 to adjust operation of one or more elements connected downstream from a PCC, to scale back operation of the grid. Consider an example of air conditioners coupled downstream from a PCC. In one example, the iGOS can detect that the grid network is experiencing heavy load, and can determine to slow down all air conditioners to relieve the grid for 5 to 10 minutes. Thus, the devices do not need to be stopped, and the grid does not need to shut off power to any segment. Instead, the power can be reduced for a period of time to selected loads to allow the grid can recover itself. Thus, the iGOS can control the load or the sources. Such operation can reduce or prevent brownouts or rolling blackouts, for example, by scaling power demand back instead of completely shutting supply down.

It will be understood that node 900 requires a certain amount of power to operate. The power consumed by node 900 can be referred to as tare loss, which indicates how much power the controlling devices consume when the node is not generating power. In one example, node 900 includes a sleep feature to reduce tare loss. For example, a node that controls a metastable energy source such as solar can sleep when there is no sun, and can wake up when the sun comes up. In one example, the node can default to a low power state and awake in response to a signal from a solar detector, power over Ethernet, or some other external signal trigger to wake it up. In one example, a node can wake up during a sleep cycle at night to perform upgrades or perform other ancillary services.

In one example, node 900 includes EST control 990. EST control 990 represents the ability of node 900 to operate as a control node to share EST information and perform computations based on EST information in accordance with any example herein. EST control 990 enables processor 910 to perform calculations or computations based on information gathered locally and compare to information shared by peer nodes to determine if local energy resources should be shared with a peer node or used locally. The determination can include any determination about how to use energy resources based on the availability of peer energy resources and the demand of peer loads.

Figure 10A:
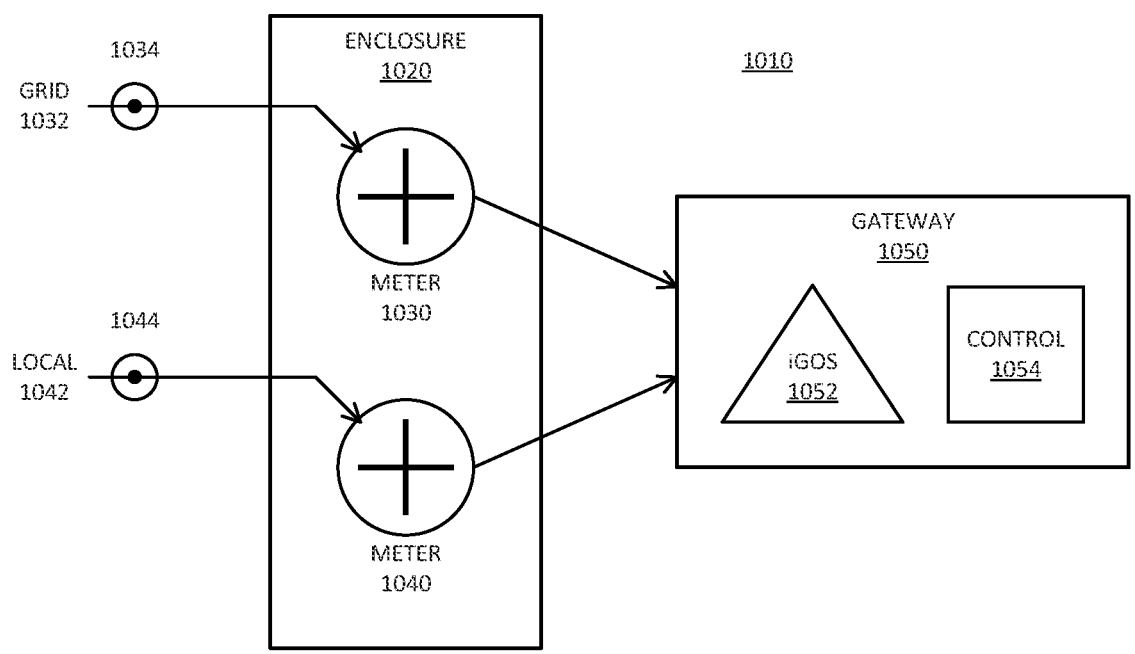
FIG. 10A is a block diagram of an example of an enclosure with multiple meters.

FIG. 10A is a block diagram of an example of an enclosure with multiple meters. System 1010 represents a system in accordance with system 700. System 1010 includes enclosure 1020 with meter 1030 and meter 1040. System 1010 also includes gateway 1050. The information of system 1010 can be used by a control node for EST computations in accordance with any example described.

Enclosure 1020 can include electrical distribution hardware for a consumer premises, in accordance with what is described above. It will be understood that meter 1030 and meter 1040 are labeled as meters for simplicity in description, but may not be considered meters in the traditional sense that they do not monitor power usage for charging a consumer. In one example, meter 1030 and meter 1040 do not measure power consumption in the same sense as a utility power meter. In one example, meter 1030 and meter 1040 sense data to compute current vectors to represent the conditions, respectively, of the grid and of the local system.

In one example, meter 1030 generates data readings of the current of grid 1032 as seen looking into PCC 1034, which is the connection point of the consumer premises to the grid. Based on the data readings, a controller can calculate a current vector for the current as seen at PCC 1034. The current vector has a magnitude and a direction, which in one example is mapped onto a 4-quadrant unit circle. The mapping of the current vector onto the unit circle can identify a combination of real (x-axis) and reactive (y-axis) power. In one example, the controller can set the grid current vector as the unit for the circle.

In one example, meter 1040 generates data readings for the current of the local system, local 1042, as seen looking into connection point 1044. Connection point 1044 represents a node within the consumer premises. The controller can compute a current vector for the local system to compare against the grid vector. In one example, the controller maps the vector onto the unit circle. The magnitude can represent an amount of resources available to the local system to adjust the local operation to change what is seen by the grid.

In one example, meters 1030 and 1040 provide their data to gateway 1050 that implements iGOS 1052. In one example, gateway 1050 includes control 1054, which represents a controller to perform the calculations. Control 1054 can also represent the control signals to send to one or more power converters (not illustrated) of the consume premises.

Figure 10B:
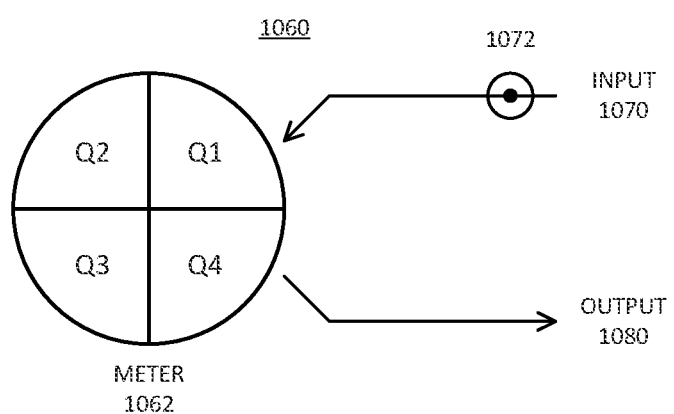
FIG. 10B represents an example of a 4-quadrant meter.

FIG. 10B represents an example of a 4-quadrant meter. Diagram 1060 represents an internal meter 1062 with input and output. The internal meters in any of the previous systems can be 4-quadrant meters. A 4-quadrant meter receives measurement data for a monitored point. The monitored point can be or include a solar system or other power generation. The monitored point can couple to a battery or other storage. The monitored point can include a power converter. The meter can provide output data to gateway 1050. Gateway 1050 represents a controller or "smarts box" that includes computer control 1054 to manage the energy generation and implement intelligence such as iGOS 1052.

Meter 1062 represents an example of either meter 1030 or meter 1040, or both meter 1030 and meter 1040. Meter 1062 receives as input 1070 the sensor or data measurement for the monitored node, such as described in the previous paragraph. Node 1072 represents the monitored node, whether grid facing or consumer facing, depending on where meter 1062 is implemented. Meter 1062 generates output 1080, which represents the measurements generated. In one example, meter 1062 generates current vector information. Meter 1062 can provide output data to gateway 1050. In one example, meter 1062 provides output to a controller in a circuit breaker enclosure box.

In one example of an enclosure, there are two meters implemented in accordance with meter 1062: one for local power generation and one for the PCC. In one example, the system includes an additional meter for a battery subsystem. In one example, each meter provides 4-quadrant monitoring of current for the monitored node, generating current vector information to provide to the iGOS to control the operation of the system to control how the power looks at each monitored node. By measuring behind the grid meter, the system can change the quadrant of operation behind the meter to cause the grid to see different operation at the consumer premises when looking from the grid side of PCC 1034.

In one example, a 4-quadrant meter can utilize a peripheral interface bus (e.g., an SPI bus) instead of serial ports, as is traditional with meter components. The SPI allows the meter to communicate information on a message basis instead of on a byte-by-byte basis. The message allows the meter to provide more or less information than a byte. In one example, meter 1062 accumulates information and provides more than a byte of information at a time. Meter 1062 can still service the messages per byte but allows the transfer of more information. The additional information can allow the system more data regarding what is happening, whereas byte-by-byte communication in a serial port may not provide sufficient information in a timely enough manner to make the computations needed to track specific current information. Thus, meter 1062 can provide increased information to the system as compared to traditional meters.

In one example, meter 1062 includes a timer that is set up with a DMA (direct memory access) service functionality to provide data directly to a memory. Such setup with a timer and DMA can allow the bypass of certain portions of the processing stack. When configured as mentioned above to allow message by message communication, meter 1062 can measure information directly into memory for analysis at the meter, by a processor that implements the measurement code. Such a setup enables the transfer of more metering data within a processing window to provide more time to make computations on the meter data. As such, the system can utilize finer-grain meter control within the system to make decisions regarding the operation of the converters and the generation of reactive power behind the grid meter.

In one example, the SPI interface is a synchronous interface. In one example, the DMA is implemented as a circular buffer. The code controlling meter 1062 can over-write the setup timers to know when to read the data from the DMA buffer. The code can keep track externally of the start and stop of the meter data. Keeping track of the start and stop externally can be accomplished through an added abstraction layer on the meter processing algorithm. As such, the code can organize the meter data into bytes, where a byte of data, for example, can represent a reading. Such an approach gathers power data much faster than traditional approaches. The increased speed can enable accumulating and averaging power information right at the meter without having to use an external controller.

In one example, meter 1062 stores data for transfer to an iGOS controller, whether locally at the circuit box, or to an external gateway, or both. In one example, meter 1062 has logging build right into the meter. The logging can store thresholds for the storing of data. For example, if certain data exceeds certain thresholds, it can be flagged as an anomaly and dumped, for example, when data looks like a spike compared to other data around it. In one example, the iGOS system can poll meter 1062. In one example, meter 1062 pushes data to the iGOS. In one example, meter 1062 follows a schedule of data transfer to the iGOS system.

Figure 11:
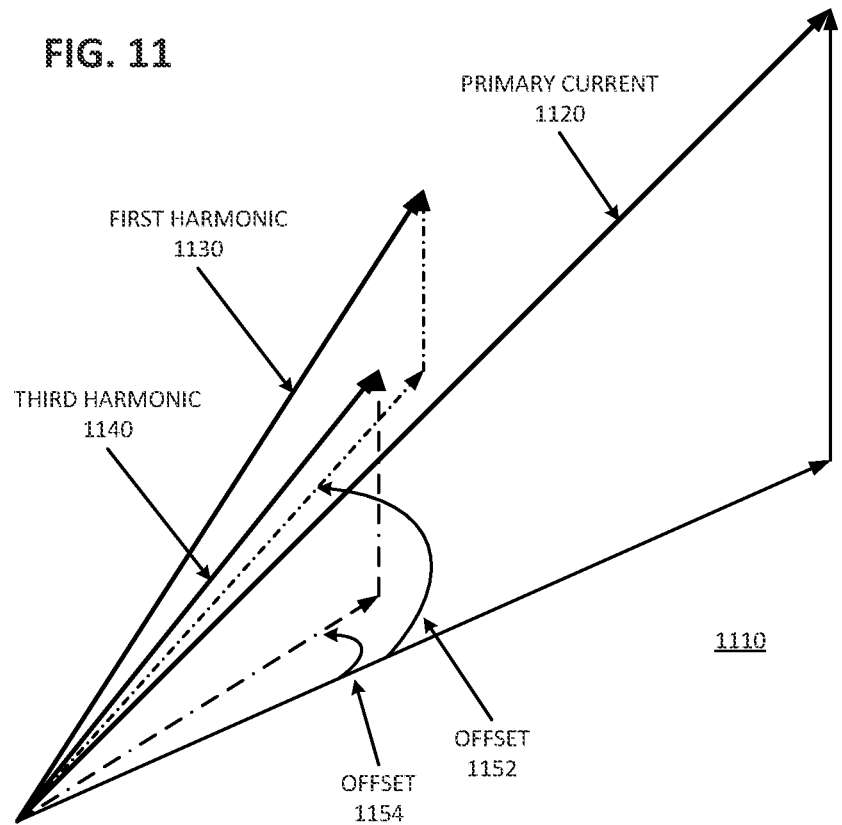
FIG. 11 is a graphical representation of an example of components of a current in a system in which harmonic components of current have angular offsets with respect to a primary current component.

FIG. 11 is a graphical representation of an example of components of a current in a system in which harmonic components of current have angular offsets with respect to a primary current component. Diagram 1110 provides a complex vector representation of current. A vector has a magnitude and a direction. Instead of simply measuring power as traditionally done, in one example, a meter (such as a meter in accordance with meter 1062 or meter 1040) can monitor power as an energy signature including a representation of a complex power vector. In one example, each signature identifies characteristics to define the signature. Each signature includes a complex vector representation that provides a vector for primary current and a vector for one or more harmonics.

Vector 1120 is the vector for primary current. In typical representation, the x-coordinate is the vector component that extends from left to right across the page. The y-component goes from bottom to top of the page. It will be understood that while not represented here for purposes of simplicity, a vector could have a negative y-component. The x-y coordinates define the end of the vector. Now assume that the x and y coordinates of primary current vector 1120 define a plane. The most correct way to envision the harmonics, in accordance with research and work done by the inventors, is to represent the harmonics as a three-dimensional vector. Thus, if the x-y coordinates of vector 1120 define a reference plane, one or more of the harmonics can have an angular offset relative to the plane of the primary current vector.

For example, consider the example of diagram 1110. The first harmonic is illustrated as having vector 1130, which includes an x component and a y component, where the magnitudes of the components can be any magnitude with respect to the primary current components. In addition to the x and y coordinates, first harmonic vector 1130 includes a z coordinate component, which defines angular offset 1152 of the current vector with respect to the reference plane of primary current vector 1120. It will be understood that the starting points of the primary current and the harmonics are the same. Thus, the third dimension of the harmonic vectors or the complex vectors is not necessarily an absolute z coordinate component, but an angular offset relative to the primary current.

As illustrated, third harmonic vector 1140 also has an x component and a y component, and angular offset 1154, which can be different (greater or less than) angular offset 1152 of first harmonic vector 1130. The angular shift of the angular offsets represents a magnetic effect on the current. The inventors have measured noticeable effects on power consumption up to the fortieth harmonic. Thus, the contribution of harmonic offsets should not be understated. The harmonics shift with respect to the angular offset due to the differing resonant effects of magnetic flux when trying to move a current. Primary current vector 1120 is the current the consumer expects to see. However, the harmonic components can add significant (measurable) power consumption. The offsets of the harmonics can shift the simple expected two-dimensional current vector into a three-dimensional current vector (complex current vector). The traditional power triangle does not fully address the power usage by the consumer, as additional power will be required to overcome the magnetic components represented by the shifted or offset harmonic components.

In one example, a controller or a gateway system makes current computations based on representations of currents in vector form in accordance with diagram 1110. In one example, a meter in accordance with meter 1062 or meter 1040 generates a vector representation of current for a monitored node and provides the data to a controller. The controller can not only identify signatures for different loads or different electrical circuits, but can identify a comparison of the grid current vector with the local current vector. The controller can send a request to a power converter to adjust operation of an output to shift the local current vector to a desired state based on where the grid vector is located on a 4 quadrant unit circle.

Figure 12:
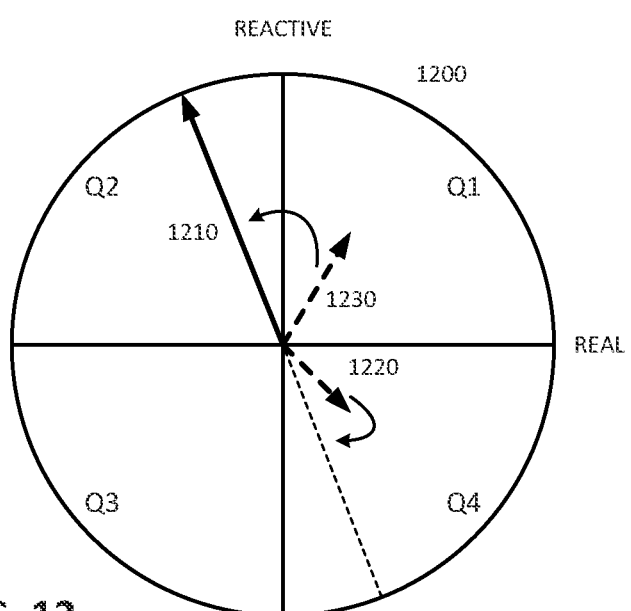
FIG. 12 is a graphical representation of an example of a grid current vector mapped against a local system current vector.

FIG. 12 is a graphical representation of an example of a grid current vector mapped against a local system current vector. Circle 1200 provides a representation of a current vector. In one example, circle 1200 illustrates diagrammatic information generated by a controller to map grid vector 1210 onto circle 1200.

In one example, the grid vector is obtained by measuring the grid current at the PCC. In one example, the grid vector is the reference vector, and thus circle 1200 can be normalized to the magnitude of vector 1210. Circle 1200 could be normalized to a different unit, such as the peak power of the consumer premises or the peak output capability of the consumer premises, where, for example, vector 1210 could represent the consumption of the consumer premises as seen at the PCC.

Circle 1200 includes two different local vectors for purposes of discussion, vector 1220 and vector 1230. In one example, a consumer premises will have only one local vector. In one example, a consumer premises includes multiple vectors based on different phases or different feeds supplied to the consumer premises.

Vector 1220 can represent where the current generation of the consumer system is at the time of measurement. In one example, the iGOS wants to shift vector 1220 to the dashed line to counteract vector 1210. Such a case could be true where vector 1210 represents consumption and vector 1220 represents generation. In another representation, the system could want to shift vector 1220 from quadrant 4 (Q4) to quadrant 2 (Q2) to align with vector 1210, if for example, the representation illustrates vectors that should be aligned for maximum efficiency. In one example, the consumer premises could have current vector 1230 in quadrant 1, which the system may want to shift to a different quadrant, such as inline with vector 1210 in quadrant 2.

It will be understood that different representations can be made of the grid vector and local vector or local vectors. The alignment or offset of those vectors can be different depending on different operation. For example, perhaps the system wants to move a local vector intentionally out of phase with the grid vector to ensure that the system provides reactive power support. Whatever the representation or the desired quadrant (which could be even more specific to a specific angle on circle 1200 within a desired quadrant), it will be understood that understanding the magnitude and angle of the vectors can allow the system to determine whether power converters should convert real power to reactive power, to adjust a mix of real and reactive power for the system, or otherwise how to shift operation.

In one example, as represented in circle 1200, a controller can make computations to determine the operations of the power converters by performing vector computations. Thus, the system can represent measured current waveforms in vector form, and perform vector computations to determine how to adjust the operation of the system to achieve the desired result. The system can compute vector calculations to determine a mix of real and reactive power needed, or to determine the mix of real and reactive power a power converter should output to shift operation of the system.

In one example, the size of circle 1200 is related to the phase difference between grid voltage (V) and current (I) of the consumer premises. The intersection of the circle with the positive vertical axis is VAR leading (at 12:00 on the circle) and the intersection with the negative vertical axis (at 6:00) is VAR lagging. Positive x-axis or leading VARs can indicate the VARs are provided from the utility, and negative x-axis or lagging VARs can indicate the VARs are supplied from the consumer premises to the grid.

Traditional DER solar panels push watts (W) back into the grid, which tends to push V and I apart. When there is a need for VARs and the traditional solar is flooding real power out onto the grid, the size of circle 1200 increases as V and I vectors diverge further. As described herein, the power converters can generate native reactive power (not reactive loading, but VAR injection) to stabilize the connection between the V and I vectors, which shrinks the circle and allows control of the quadrant of operation for the consumer premises.

Figure 13:
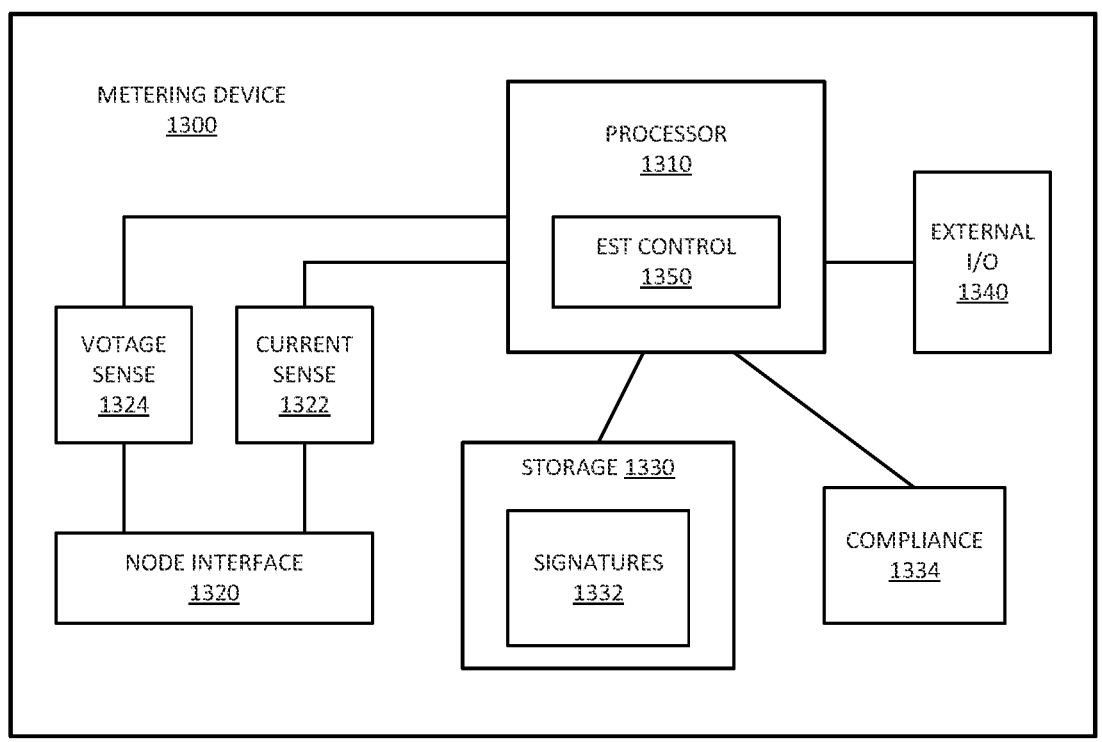
FIG. 13 is a block diagram of an example of a metering device that monitors power at a PCC.

FIG. 13 is a block diagram of an example of a metering device that monitors power at a PCC. Metering device 1300 can be an internal meter or internal sensor in accordance with any example described. In one example, metering device 1300 is a sensor in an enclosure, such as in accordance with system 700.

Metering device 1300 includes hardware components to interconnect to a management system, such as a gateway device or other iGOS system. In one example, metering device 1300 includes node interface 1320, which represents hardware to enable metering device to measure or monitor the energy usage or production or both energy use and energy production of electrical circuits. In one example, metering device 1300 includes voltage sense hardware 1324 and current sense hardware 1322. Current sense hardware 1322 can measure current drawn at a monitored node or energy supplied into the node, and can include hardware capable to measure harmonic components of the measured power. Current sense 1322 can include magnitude, phase offset (e.g., power factor), frequency, or other electrical properties of a current waveform at the monitored node. In one example, metering device 1300 can generate energy signatures and compare such energy signature computations to stored energy signatures 1332. Metering device 1300 can also store new energy signatures computed as signatures 1332. Voltage sense hardware 1324 can measure a voltage including phase, frequency, magnitude, or other electrical property of the voltage waveform at the monitored node.

Processor 1310 represents control logic or a controller for metering device 1300. Processor 1310 can be configured or programmed to perform the energy monitoring. Processor 1310 can be configured to perform computations to compute energy signatures, generate complex current vectors, or compare current and voltage readings to energy signatures or other current vectors. In one example, processor 1310 determines how current can be adjusted to compensate for harmonics, a grid condition, or other condition to cause a monitored node to be at a desired current vector location on a unit circle.

Metering device 1300 includes external I/O 1340 to enable metering device 1300 to connect to other metering devices, or to connect to a management system of a consumer premises where metering device 1300 is implemented. In one example, external I/O 1340 enables metering device 1300 to send data to a gateway device.

In one example, metering device 1300 includes storage resources, such as memory or hard drives or solid state storage, represented as storage 1330. In one example, metering device 1300 stores signatures or vectors for local use by the metering device or as data to send to an external controller. The signatures or vectors are represented in metering device 1300 as signatures 1332, which can simply represent waveform data for a monitored node. The waveform data can include data that represents or that can be used to calculate a complex current vector representing a condition of a current waveform at the monitored node.

In one example, processor 1310 accesses one or more items of compliance information 1334. In one example, compliance information 1334 is stored in storage 1330. In one example, compliance information 1334 is received via external I/O 1340. In one example, processor 1310 computes a current waveform phase and shape desired for a given power demand scenario or power generation scenario based on compliance information 1334. Thus, compliance information 1334 can affect how metering device 1300 operates. In one example, external I/O 1340 enables metering device 1300 to couple to an associated converter or converters. Based on calculations made by processor 1310, in one example, metering device 1300 can signal a power converter how to operate to achieve the desired current. In one example, metering device 1300 simply indicates the desired current to the power converter, which can then separately compute how to generate the current. In one example, metering device 1300 computes specific parameters as input to a power converter device to cause it to adjust its operation for the desired current vector.

In one example, processor 1310 includes EST control 1350. EST control 1350 represents the ability of metering device 1300 to provide information as part of a control node to share EST information and perform computations based on EST information in accordance with any example described. EST control 1350 enables processor 1310 to perform calculations or computations based on information gathered locally and compare to information shared by peer nodes to determine if local energy resources should be shared with a peer node or used locally. The determination can include any determination about how to use energy resources based on the availability of peer energy resources and the demand of peer loads.

Figure 14:
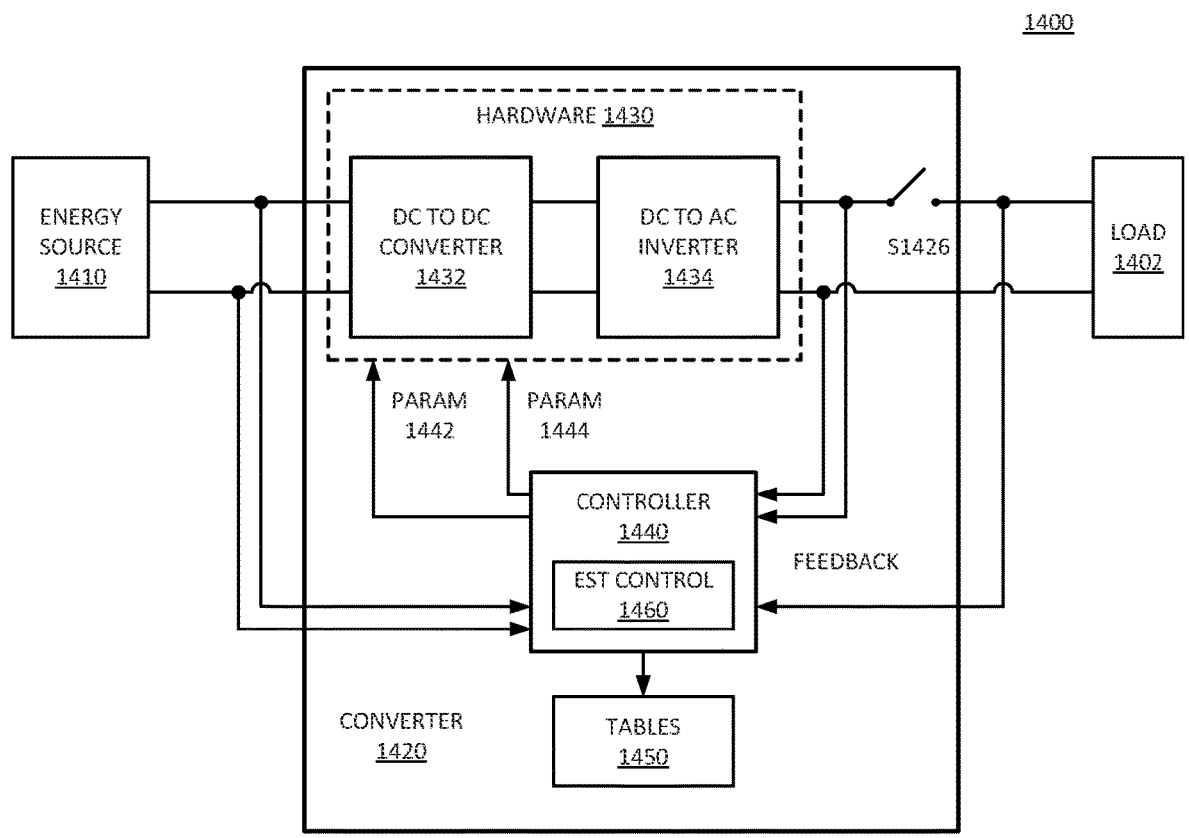
FIG. 14 is a block diagram of an example of a power converter capable of reactive power injection.

FIG. 14 is a block diagram of an example of a power converter capable of reactive power injection. System 1400 illustrates power converter 1420 that couples an input to an output. Power converter 1420 can be a power converter or microinverter in accordance with any description herein.

Fundamentally, power converter 1420 has electrical isolation between the output and the input. The electrical isolation enables power converter 1420 to perform impedance matching at the input with a source while also performing impedance matching at the output with a load. The impedance matching at both input and output can be accomplished through an internal node that isolates the input to allow the power converter to simply match whatever input the source is capable of providing, and to float the output to any voltage of the load.

System 1400 includes energy source 1410, which represents any DC (direct current) source of power. Energy source 1410 can be any example of energy generation, such as solar cells/array, wind power generator, or other time-varying or green power source. Energy source 1410 couples to hardware 1430 which electrically isolates the source from the output.

Hardware 1430 includes DC/DC converter 1432 to convert the DC input to an isolated DC source. Hardware 1430 includes DC/AC inverter 1434 to convert the isolated DC power into an alternating current (AC) to provide as the output. DC/AC inverter 1434 can generate the output with any desired phase as described below.

DC-to-DC (or DC/DC) converter 1432 which electrically isolates the source from the output. DC/DC converter 1432 has a dashed line to illustrate an internal node that can float on either side to match the electrical connection. For example, DC/DC converter 1432 can have an input transformer coupled to a separate output transformer, with the induced lines of the transformers coupled to each other on the internal node. The internal node can then simply float to whatever voltage is needed to pass current between the transformers. The input transform isolates the input and the output transformer isolates the output.

The input and output are internally isolated from each other by the floating node, which is charged with magnetic flux by high frequency switching of the input DC voltage. Thus, the internal node can simply float and receive any energy provided by the source, and deliver all available energy to the output at whatever voltage the output operates. The output will simply float to the load voltage and deliver current.

Hardware 1430 can impedance match by changing operation of the input interface of DC/DC converter 1432 to maximize energy transfer from source 1410 without fixing the voltage or current of the input to specific values. Rather, the input can allow the power to float to whatever voltage is produced by source 1410, and the current will match based on whatever total power is produced. Similarly, on the output, hardware 1430 impedance matches by changing operation of the output interface of DC/AC inverter 1434 to the load to allow the load to draw whatever power is needed at whatever voltage the load operates at. Thus, the output of hardware 1430 can float to match the voltage of the load (e.g., load 1402), and generate current to match the total power available.

Hardware 1430 can generate an output current waveform for DC/AC inverter 1434, where the magnitude is determined by how much energy is available, and whatever the load is at. Thus, the output floats to match the load, and is not fixed at a specific current or a specific voltage. The internal node between DC/DC converter 1432 and DC/AC inverter 1434 can act as an energy reservoir, where the input impedance matching enables the efficient charging of the internal node, and the output impedance matching enables the load to draw energy from the internal node.

Controller 1440 represents control hardware or a CPU (central processing unit) or processor of power converter 1420. Parameters (param) 1442 can control the input operation and parameters (param) 1444 can control the output operation. The input and output operations can both be controlled by switching device having a configured duty cycle to control the access to the energy of the internal node. In one example, controller 1440 receives input characteristic information from energy source 1410 to set parameters 1442 and 1444.

In one example, power converter 1420 includes tables 1450, which provide a table-based mechanism for generating an output current, which can provide an idealized output current instead of simply trying to generate a current based on the grid voltage, as is typically done. The idealized waveform of tables 1450 enables the output hardware to generate an ideally-shaped waveform without harmonic distortion, and which can be generated at any desired phase offset relative to the grid voltage. Thus, the idealized waveform enables power converter 1420 to output power electrically isolated from the input, and at any phase angle relative to the system connected to. As such, power converter 1420 can actually generate reactive power, instead of simply provide reactive loading to change the power factor. As such, power converter 1420 operates as a virtual spinning generator, which can generate an output current at any desired phase relative to a grid voltage.

Tables 1450 may include entries that are obtained based on input conditions measured from the system, to achieve a desired mix of real and reactive power. Feedback from the output can include voltage zero crossing, voltage amplitude, and current waveform information. With such information, controller 1440 can use tables 1450 to adjust the operation of DC/DC converter 1432 or DC/AC inverter 1434, or the operation of both. The tables may include setpoints that provide idealized output signals the system attempts to create. By matching output performance to an idealized representation of the input power, better system performance is possible than simply attempting to filter and adjust the output as traditionally done.

Controller 1440 can monitor the AC current, which moves out of DC/AC inverter 1434, and the target voltage of the load, such as load 1402 or a power grid (not specifically shown). Controller 1440 controls at least one electrical parameter of the interfaces of hardware 1430 to control its operation. Parameters 1442 and 1444 represent control from controller 1440 to control the operation of hardware 1430 within converter 1420. In one example, parameters 1442 can include a duty cycle of a switching signal of the power extraction for DC/DC converter 1432, which changes input impedance matching, which in turn controls the charging of the internal node. In one example, parameter 1444 can represent a duty cycle or other control signal to change an operation of DC/AC inverter 1434, which changes the output impedance matching, which in turns controls the outflow of energy from the internal node. The modification of each parameter can be dependent on the quality of the monitored current and voltage. Controller 1440 further controls switching device S2426 to couple the load to power produced by power converter 1420, when suitably conditioned power is available for use by load 1402.

Power converter 1420 includes switching device S2426 (e.g., a relay) to selectively connect hardware 1430 to load 1402. When power converter 1420 is grid-tied, the output can also connect to the grid through S2426. Under normal operation, DC power is drawn from source 1410, and extracted, inverted, and dynamically treated by power converter 1420, to dynamically produce maximum AC current relatively free of harmonic distortion and variability, and at a desired phase with respect an AC voltage signal from the grid or from load 1402.

In one example, power converter 1420 can generate AC current intentionally out of phase to a certain extent with respect to the AC voltage signal of the grid. Thus, the single power converter 1420 can generate reactive power to deliver power at any desired phase offset to satisfy load 1402 or to compensate for conditions on the power grid. In one example, multiple power converters 1420 can operate in parallel at the same interface. When coupled to the same interface, they can still independently operate to output power at an specified phase for each output to generate any ratio of real and reactive power from each one, or from the group.

In one example, system 1400 can be applied without a specific energy source 1410. For example, power converter 1420 can be coupled to receive power from the grid and generate an output to load 1402 that provides whatever mix of real and reactive power is needed by load 1402. In such an example, the power converter could be operated in reverse by connecting to the grid as a source for DC/AC inverter 1434 and output through DC/DC converter 1432 to the load.

In one example, controller 1440 includes EST control 1460. EST control 1460 represents the ability of converter 1420 to respond to EST information as part of a control node to share EST information and perform computations based on EST information in accordance with any example described. EST control 1460 enables controller 1440 to perform calculations or computations based on information gathered locally and compare to information shared by peer nodes to determine if local energy resources should be shared with a peer node or used locally. The determination can include any determination about how to use energy resources based on the availability of peer energy resources and the demand of peer loads.

Figure 15:
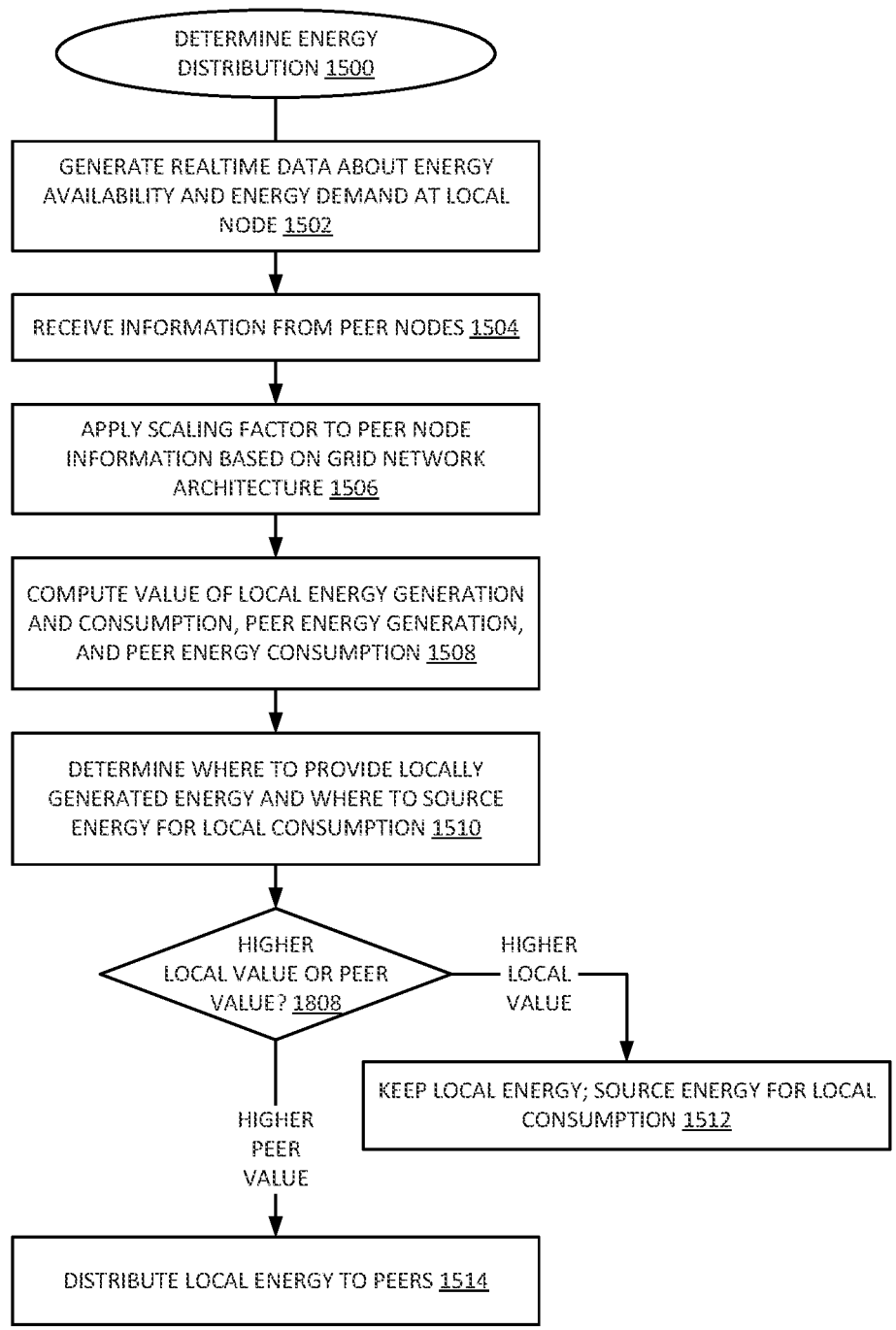
FIG. 15 is a flow diagram of an example of a process for determine whether to distribute locally generated energy.

FIG. 15 is a flow diagram of an example of a process for determine whether to distribute locally generated energy. Process 1500 represents a process to determine energy distribution within a grid network of consumer nodes. Process 1500 can be executed by a control node in accordance with any example described, or a controller that performs control operations within a customer premises. A controller can execute operations of process 1500 to control the operation of one or more power converters or microinverters to control the flow of energy within a consumer node, or outside a consumer node, or both within the consumer node and outside the consumer node.

In one example, the control node generates realtime data about energy availability and energy demand at a local consumer node, at 1502. In one example, the control node receives information from one or more peer nodes, at 1504. The information from the peer nodes indicates realtime data about energy availability and energy demand at external nodes.

In one example, the control node applies a scaling factor to the peer node information based on the grid network architecture, at 1506. In one example, the control node scales the peer node information by a factor based on a physical distance between the local node and the peer node. In one example, the control node scales the peer node information by a factor based on a time to exchange energy between the local node and the peer node. In one example, the control node scales the peer node information by a factor based on a physical distance between the local node and the peer node and a factor based on time to exchange energy between the local node and the peer node.

In one example, the control node computes a value of local energy generation and consumption, peer energy generation, and peer energy consumption, at 1508. The EST computations can enable the control node to determine a value of sharing locally generated energy and a value of receiving energy from a peer node. The computations can compute a value of local consumption of energy versus consumption of local energy at a peer node. Thus, the system can determine the realtime value of energy generation and consumption, allowing the system to dynamically transfer data among the grid network based on where it will have the most valuable impact. The value of the energy is a good reflection of the impact the energy will have on grid stability and operation, seeing that the value of energy is adjusted based on where the energy is most needed at a given moment in time. The realtime information for the peers allows each peer to dynamically adjust operation not just based on what is happening within a particular consumer node, but what is happening at peer nodes.

In one example, the control node determines where to provide locally generated energy and where to source energy for local consumption based on the EST computations, at 1510. In one example, the control node determines if there is higher local value or higher peer value in the locally generated energy, at 1512. If there is higher peer value, in one example, the control node distributes local energy to one or more peer nodes, at 1514. If there is higher local value, in one example, the control node keeps the local energy, at 1516. In one example, when there is higher local value, the control node can alternatively or additionally source additional energy for local consumption from capacity available from one or more peer nodes, at 1516.

In general with respect to the descriptions herein, in one example a distributed energy resource (DER) node includes: a local energy source; a local energy load local to the local energy source; and a controller to generate data about realtime energy availability from the local energy source and realtime energy demand from the local energy load, receive shared information from an external node of a DER network about energy availability from the external node and energy demand from the external node demand, the shared information scaled based on a delay to exchange energy between the external node and the DER node, and compute a value of use of energy from the local energy source at the local energy load, versus use of the energy from the local energy source at the external node, versus use of energy from the external node at the local energy load.

In one example of the DER node, the local energy source comprises a renewable energy source. In accordance with any preceding example of the DER node, in one example, the local energy source comprises a battery. In accordance with any preceding example of the DER node, in one example, the controller is to compute the value of the use of energy including local real power demand and local reactive power demand. In accordance with any preceding example of the DER node, in one example, the controller is to compute the value of the use of energy from the local energy source, including generation of a mix of real and reactive power for the local energy load from the local energy source. In accordance with any preceding example of the DER node, in one example, the controller is to compute the value of the use of energy from the local energy source, including generation of a mix of real and reactive power for the external node from the local energy source. In accordance with any preceding example of the DER node, in one example, the shared information is to be scaled by a factor based on a physical distance between the DER node and the external node. In accordance with any preceding example of the DER node, in one example, the shared information is to be scaled by a factor based on a time to exchange energy between the DER node and the external node. In accordance with any preceding example of the DER node, in one example, the external node comprises a node on a same energy grid subnet as the DER node. In accordance with any preceding example of the DER node, in one example, the external node comprises a node on a different energy grid subnet from the DER node. In accordance with any preceding example of the DER node, in one example, the external node comprises a first external node with first shared information to be scaled by a first scaling factor, and further comprising a second external node with second shared information to be scaled by a second scaling factor different from the first scaling factor. In accordance with any preceding example of the DER node, in one example, the second external node comprises a node on a same energy grid subnet as the first external node, where the second scaling factor is to indicate a different realtime value for sharing energy between the DER node and the second external node as compared to a realtime value for sharing energy between the DER node and the first external node on the energy grid subnet. In accordance with any preceding example of the DER node, in one example, the second external node comprises a node on a different energy grid subnet as the first external node, where the second scaling factor is to indicate a different realtime value for sharing energy between the DER node and the second external node on one energy grid subnet as compared to a realtime value for sharing energy between the DER node and the first external node on a different energy grid subnet. In accordance with any preceding example of the DER node, in one example, the DER node includes: a microinverter to generate a ratio of real and reactive power from the local energy source; wherein the controller is to compute the value of the energy including a computation of an ability of the microinverter to generate the ratio of real and reactive power from the local energy source. In accordance with any preceding example of the DER node, in one example, the controller is to further generate a blockchain transaction log to represent sharing of energy between the DER node and the external node.

In general with respect to the descriptions herein, in one example a method for energy distribution in a grid network includes: generating data about realtime energy availability from a local energy source and realtime energy demand from a local energy load, the local energy source and the local energy load part of a distributed energy resource (DER) node; receiving shared information from an external node of a DER network about energy availability from the external node and energy demand from the external node demand, the shared information scaled based on a delay to exchange energy between the external node and the DER node; and computing a value of use of energy from the local energy source at the local energy load, versus use of the energy from the local energy source at the external node, versus use of energy from the external node at the local energy load.

In one example of the method, the local energy source comprises a renewable energy source. In accordance with any preceding example of the method, in one example, the local energy source comprises a battery. In accordance with any preceding example of the method, in one example, computing the value of the use of energy from the local energy source comprising computing the value of the use of energy including local real power demand and local reactive power demand. In accordance with any preceding example of the method, in one example, computing the value of the use of energy from the local energy source comprising computing the value of the use of energy from the local energy source, including generation of a mix of real and reactive power for the local energy load from the local energy source. In accordance with any preceding example of the method, in one example, computing the value of the use of energy from the local energy source comprising computing the value of the use of energy from the local energy source, including generation of a mix of real and reactive power for the external node from the local energy source. In accordance with any preceding example of the method, in one example, the shared information is scaled by a factor based on a physical distance between the DER node and the external node. In accordance with any preceding example of the method, in one example, the shared information is scaled by a factor based on a time to exchange energy between the DER node and the external node. In accordance with any preceding example of the method, in one example, the external node comprises a node on a same energy grid subnet as the DER node. In accordance with any preceding example of the method, in one example, the external node comprises a node on a different energy grid subnet from the DER node. In accordance with any preceding example of the method, in one example, the external node comprises a first external node with first shared information scaled by a first scaling factor, and further comprising a second external node with second shared information scaled by a second scaling factor different from the first scaling factor. In accordance with any preceding example of the method, in one example, the second external node comprises a node on a same energy grid subnet as the first external node, where the second scaling factor indicates a different realtime value for sharing energy between the DER node and the second external node as compared to a realtime value for sharing energy between the DER node and the first external node on the energy grid subnet. In accordance with any preceding example of the method, in one example, the second external node comprises a node on a different energy grid subnet as the first external node, where the second scaling factor indicates a different realtime value for sharing energy between the DER node and the second external node on one energy grid subnet as compared to a realtime value for sharing energy between the DER node and the first external node on a different energy grid subnet. In accordance with any preceding example of the method, in one example, the method includes: generating, with a microinverter at the DER node, a ratio of real and reactive power from the local energy source; wherein computing the value of the use of energy from the local energy source comprising computing the value of the energy including a computation of an ability of the microinverter to generate the ratio of real and reactive power from the local energy source. In accordance with any preceding example of the method, in one example, the method includes generating a blockchain transaction log to represent sharing of energy between the DER node and the external node.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A distributed energy resource (DER) node, comprising:
   a local energy source;
   a local energy load local to the local energy source; and
   a controller to generate data about realtime energy availability from the local energy source and realtime energy demand from the local energy load, receive shared information from an external node of a DER network about energy availability from the external node and energy demand from the external node demand, the shared information scaled based on a delay to exchange energy between the external node and the DER node, and compute a value of use of energy based on the shared information, to compare use of energy from the local energy source at the local energy load, to use of the energy from the local energy source at the external node, to use of energy from the external node at the local energy load.

2. The DER node of claim 1, wherein the local energy source comprises a renewable energy source.

3. The DER node of claim 1, wherein the local energy source comprises a battery.

4. The DER node of claim 1, wherein the controller is to compute the value of the use of energy including local real power demand and local reactive power demand.

5. The DER node of claim 1, wherein the controller is to compute the value of the use of energy from the local energy source, including generation of a mix of real and reactive power for the local energy load from the local energy source.

6. The DER node of claim 1, wherein the controller is to compute the value of the use of energy from the local energy source, including generation of a mix of real and reactive power for the external node from the local energy source.

7. The DER node of claim 1, wherein the shared information is to be scaled by a factor based on a physical distance between the DER node and the external node.

8. The DER node of claim 1, wherein the shared information is to be scaled by a factor based on a time to exchange energy between the DER node and the external node.

9. The DER node of claim 1, wherein the external node comprises a node on a same energy grid subnet as the DER node.

10. The DER node of claim 1, wherein the external node comprises a node on a different energy grid subnet from the DER node.

11. The DER node of claim 1, wherein the external node comprises a first external node with first shared information to be scaled by a first scaling factor, and further comprising a second external node with second shared information to be scaled by a second scaling factor different from the first scaling factor.

12. The DER node of claim 11, wherein the second external node comprises a node on a same energy grid subnet as the first external node, where the second scaling factor is to indicate a different realtime value for sharing energy between the DER node and the second external node as compared to a realtime value for sharing energy between the DER node and the first external node on the energy grid subnet.

13. The DER node of claim 11, wherein the second external node comprises a node on a different energy grid subnet as the first external node, where the second scaling factor is to indicate a different realtime value for sharing energy between the DER node and the second external node on one energy grid subnet as compared to a realtime value for sharing energy between the DER node and the first external node on a different energy grid subnet.

14. The DER node of claim 1, further comprising:
   a microinverter to generate a ratio of real and reactive power from the local energy source;
   wherein the controller is to compute the value of the energy including a computation of an ability of the microinverter to generate the ratio of real and reactive power from the local energy source.

15. The DER node of claim 1, wherein the controller is to further generate a blockchain transaction log to represent sharing of energy between the DER node and the external node.

16. A method for energy distribution in a grid network, comprising:
   generating data about realtime energy availability from a local energy source and realtime energy demand from a local energy load, the local energy source and the local energy load part of a distributed energy resource (DER) node;

receiving shared information from an external node of a DER network about energy availability from the external node and energy demand from the external node demand, the shared information scaled based on a delay to exchange energy between the external node and the DER node; and computing a value of use of energy based on the shared information, to compare use of energy from the local energy source at the local energy load, to use of the energy from the local energy source at the external node, to use of energy from the external node at the local energy load.

17. The method of claim 16, wherein computing the value of the use of energy from the local energy source comprising computing a mix of real and reactive power for the local energy load from the local energy source.

18. The method of claim 16, wherein computing the value of the use of energy from the local energy source comprising computing a mix of real and reactive power for the external node from the local energy source.

19. The method of claim 16, wherein the shared information is scaled by a factor based on a physical distance between the DER node and the external node and based on a time to exchange energy between the DER node and the external node.

20. The method of claim 16, further comprising:

generating a blockchain transaction log to represent sharing of energy between the DER node and the external node.

* * * * *